United States Patent
Meng et al.

(10) Patent No.: US 11,069,338 B2
(45) Date of Patent: Jul. 20, 2021

(54) INTERACTIVE METHOD, INTERACTIVE TERMINAL, STORAGE MEDIUM, AND COMPUTER DEVICE

(71) Applicant: TENCENT TECHNOLOGY (SHENZHEN) COMPANY LIMITED, Shenzhen (CN)

(72) Inventors: Binbin Meng, Shenzhen (CN); Zhibo Chen, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 203 days.

(21) Appl. No.: 16/533,141

(22) Filed: Aug. 6, 2019

(65) Prior Publication Data

US 2019/0362707 A1 Nov. 28, 2019

Related U.S. Application Data

(63) Continuation of application No. PCT/CN2018/095836, filed on Jul. 16, 2018.

(30) Foreign Application Priority Data

Jul. 26, 2017 (CN) .......................... 201710620007.7

(51) Int. Cl.
*G10L 15/04* (2013.01)
*G06K 9/00* (2006.01)
(Continued)

(52) U.S. Cl.
CPC .......... *G10L 15/04* (2013.01); *G06K 9/00248* (2013.01); *G06K 9/00268* (2013.01);
(Continued)

(58) Field of Classification Search
CPC ......... G10L 15/04; G10L 15/14; G10L 15/26; G10L 15/16; G10L 2015/088;
(Continued)

(56) References Cited

U.S. PATENT DOCUMENTS

| 2002/0087321 | A1 | 7/2002 | Watanabe et al. |
| 2005/0137747 | A1* | 6/2005 | Miro ...................... G06N 3/008 700/245 |
| 2018/0307680 | A1* | 10/2018 | Wu ...................... G06F 16/3346 |

FOREIGN PATENT DOCUMENTS

| CN | 105425970 A | 3/2016 |
| CN | 106095834 A | 11/2016 |
| CN | 107423398 A | 12/2017 |

OTHER PUBLICATIONS

The World Intellectual Property Organization (WIPO) International Search Report for PCT/CN2018/095836 dated Sep. 30, 2018 5 Pages (including translation).

* cited by examiner

*Primary Examiner* — Charlotte M Baker
(74) *Attorney, Agent, or Firm* — Anova Law Group, PLLC

(57) ABSTRACT

An interactive method is provided for an interactive terminal. The method includes obtaining visitor voice data of a visitor; and performing word segmentation on a text obtained by recognizing the visitor voice data, to obtain a feature word set. The method also include determining, according to a topic generation model and the feature word set, a determined topic to which the text belongs; and separately obtaining appearing probabilities corresponding to feature words in the feature word set when the feature words belong to the determined topic. The method further includes selecting a feature word from the feature words of the feature word set according to the appearing probabilities
(Continued)

corresponding to the feature words; and obtaining and outputting visitor interactive content corresponding to the selected feature word.

20 Claims, 10 Drawing Sheets

(51) Int. Cl.
    *G06N 3/08*         (2006.01)
    *G10L 15/14*       (2006.01)
    *G10L 15/26*       (2006.01)

(52) U.S. Cl.
    CPC ............... *G06N 3/08* (2013.01); *G10L 15/14* (2013.01); *G10L 15/26* (2013.01)

(58) Field of Classification Search
    CPC ............... G10L 15/22; G06K 9/00248; G06K 9/00268; G06K 9/6218; G06K 9/6273; G06N 3/08; G06N 7/005; G06N 3/0445; G06N 3/0454; G06F 16/3329; G06F 40/284
    USPC ................ 704/251; 472/137; 700/245; 318/568.12; 706/46
    See application file for complete search history.

INTERACTIVE METHOD, INTERACTIVE TERMINAL, STORAGE MEDIUM, AND COMPUTER DEVICE

CROSS-REFERENCES TO RELATED APPLICATIONS

This application is a continuation application of PCT Patent Application No. PCT/CN2018/095836, filed on Jul. 16, 2018, which claims priority to Chinese Patent Application No. 201710620007.7, entitled "INTERACTIVE METHOD, STORAGE MEDIUM, AND COMPUTER DEVICE" filed with the China National Intellectual Property Administration on Jul. 26, 2017, the entire contents of both of which are incorporated herein by reference.

FIELD OF THE TECHNOLOGY

Embodiments of the present invention relate to the field of computer technologies and, in particular, to an interactive method, an interactive terminal, a storage medium, and a computer device.

BACKGROUND

With the progress of society and the development of science and technologies, interactions among people are increasingly frequent, and scenarios in which interactions are needed are also growing. In a conventional visiting scenario of a visitor, a staff member usually needs to manually learn the visiting intention of the visitor, and then interacts with the visitor subsequently according to the visiting intention of the visitor.

However, in the conventional interactive manner for manually interacting with visitors, a lot of human and material resources need to be consumed in the interaction process, and a heavy workload is introduced, causing low efficiency of interacting with the visitors.

The disclosed methods and systems are directed to solve one or more problems set forth above and other problems.

SUMMARY

According to one aspect of the present disclosure, an interactive method is provided for an interactive terminal. The method includes obtaining visitor voice data of a visitor; and performing word segmentation on a text obtained by recognizing the visitor voice data, to obtain a feature word set. The method also include determining, according to a topic generation model and the feature word set, a determined topic to which the text belongs; and separately obtaining appearing probabilities corresponding to feature words in the feature word set when the feature words belong to the determined topic. The method further includes selecting a feature word from the feature words of the feature word set according to the appearing probabilities corresponding to the feature words; and obtaining and outputting visitor interactive content corresponding to the selected feature word.

According to another aspect of the present disclosure, an interactive terminal is provided. The terminal includes one or more processors and one or more memories. The memory stores at least one application program, and the at least one application program is suitable for being loaded by the processor to perform: obtaining visitor voice data of a visitor; performing word segmentation on a text obtained by recognizing the visitor voice data, to obtain a feature word set; determining, according to a topic generation model and the feature word set, a determined topic to which the text belongs; separately obtaining appearing probabilities corresponding to feature words in the feature word set when the feature words belong to the determined topic; selecting a feature word from the feature words of the feature word set according to the appearing probabilities corresponding to the feature words; and obtaining and outputting visitor interactive content corresponding to the selected feature word.

According to another aspect of the present disclosure, a non-transitory computer-readable storage medium is provided. The non-transitory computer-readable storage medium stores computer program instructions executable by at least one processor to perform: obtaining visitor voice data of a visitor; performing word segmentation on a text obtained by recognizing the visitor voice data, to obtain a feature word set; determining, according to a topic generation model and the feature word set, a determined topic to which the text belongs; separately obtaining appearing probabilities corresponding to feature words in the feature word set when the feature words belong to the determined topic; selecting a feature word from the feature words of the feature word set according to the appearing probabilities corresponding to the feature words; and obtaining and outputting visitor interactive content corresponding to the selected feature word.

DESCRIPTION OF EMBODIMENTS

To make the objectives, technical solutions, and advantages of the embodiments clearer and more comprehensible, the following further describes the present disclosure in detail with reference to the accompanying drawings. It should be understood that the specific embodiments described herein are merely used to explain the present disclosure but are not intended to limit the present disclosure.

Figure 1:
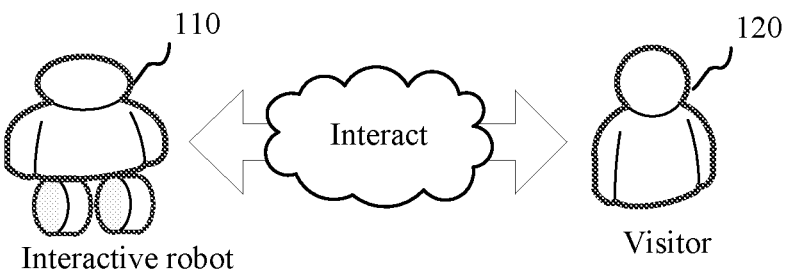
FIG. 1 is a diagram of an application environment of an interactive method according to an embodiment of the present disclosure.

FIG. 1 is a diagram of an application environment of an interactive method in an embodiment. As shown in FIG. 1, the application environment includes an interactive robot 110 and a visitor 120. The interactive robot 110 may perform an interactive method to interact with the visitor 120. A person skilled in the art may understand that, the application environment shown in FIG. 1 is only some scenarios related to the present disclosure, and does not construct a limitation to the application environment of the solutions of this application. The application environment may be applied to an indoor scenario or an open outdoor scenario.

Figure 2:
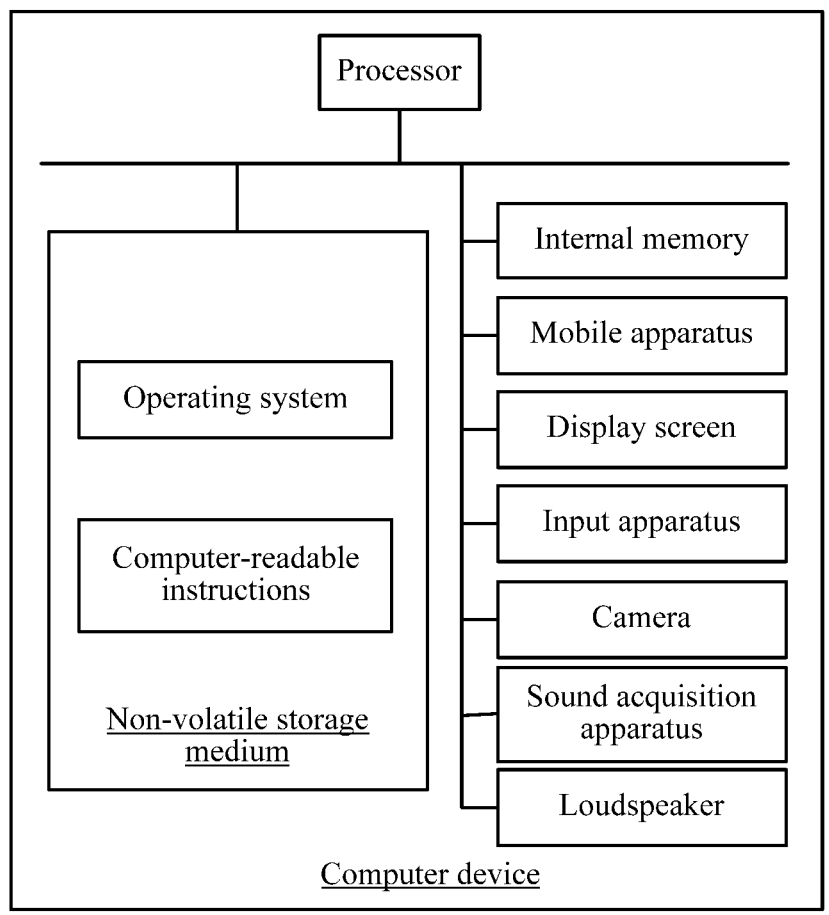
FIG. 2 is a schematic diagram of an internal structure of a computer device according to an embodiment of the present disclosure.

The interactive robot 110 may include a computer device or may be implemented by a computer device. FIG. 2 is a schematic diagram of an internal structure of a computer device in an embodiment. As shown in FIG. 2, the computer device includes a processor, a non-volatile storage medium, an internal memory, a camera, a sound acquisition apparatus, a loudspeaker, a display screen, an input apparatus, and a mobile apparatus that are connected by using a system bus. The non-volatile storage medium of the computer device stores an operating system, and may further store computer-readable instructions. The computer-readable instructions, when executed by the processor, may cause the processor to implement an interactive method.

The processor is configured to provide computation and control capabilities, to support running of the entire computer device. The internal memory may also store computer-readable instructions. The computer-readable instructions, when executed by the processor, may cause the processor to implement an interactive method. The display screen of the computer device may be a liquid crystal display screen or an e-ink display screen or the like. The input apparatus may be a touch layer covering the display screen, or may be a button, a trackball, or a touchpad disposed on a terminal housing, or may be an external keyboard, touchpad, or mouse or the like. The computer device may be a removable electronic device, and may be specifically the interactive robot 110 shown in FIG. 1, or the like. The computer device may be further connected to a server through a network, to send data to the server for processing, for example, send an obtained image frame to the server for face detection. A person skilled in the art may understand that, in the structure shown in FIG. 2, only a block diagram of a partial structure related to a solution in this application is shown, and does not constitute a limit to the terminal to which the solution in this application is applied. Specifically, the terminal may include more components or fewer components than those shown in the figure, or some components may be combined, or a different component deployment may be used.

Figure 3:
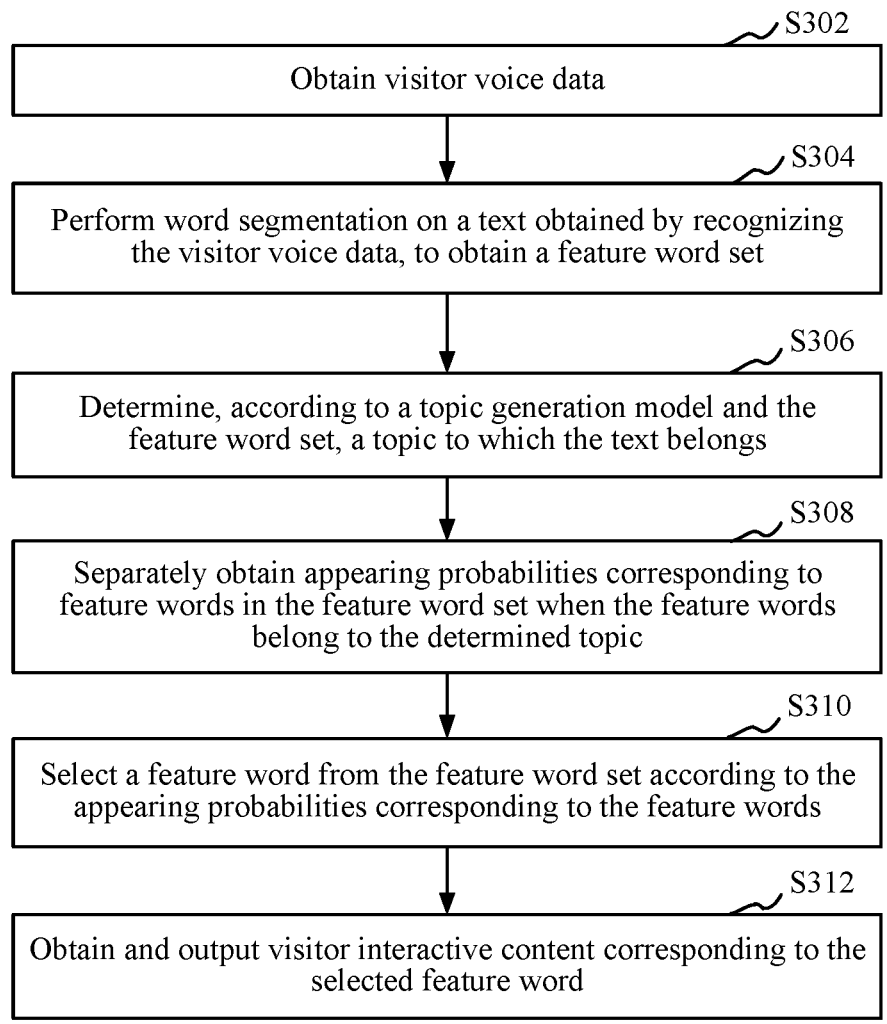
FIG. 3 is a schematic flowchart of an interactive method according to an embodiment of the present disclosure.

As shown in FIG. 3, in an embodiment, an interactive method is provided. This embodiment is described by using an example in which the method is applied to the interactive robot in FIG. 1. Referring to FIG. 3, the interactive method specifically includes the followings.

S302. Obtaining visitor voice data.

The visitor voice data includes voice data reflecting a visit intention of a visitor. The visitor voice data may be voice data acquired on-site, or may be voice data recorded in advance, or may be received voice data transmitted by another computer device.

In an embodiment, the interactive robot may directly invoke a local sound acquisition apparatus to acquire environmental sound, and detect whether the acquired environmental sound includes visitor voice data, to obtain the visitor voice data when detecting that the environmental sound includes the visitor voice data.

In an embodiment, the interactive robot may also provide an operation entry used for inputting voice, detect a trigger operation of a visitor for the operation entry, trigger a corresponding voice acquisition instruction according to the detected trigger operation, and invoke the local sound acquisition apparatus according to the voice acquisition instruction to acquire voice data inputted by the visitor, to obtain the visitor voice data. The operation entry may be an icon, a text link, or a virtual button or the like.

In an embodiment, the interactive robot may further establish a connection to another computer device, and receive voice data transmitted by that computer device, to obtain the visitor voice data.

S304. Performing word segmentation on texts obtained by recognizing the visitor voice data, to obtain a feature word set.

The word segmentation refers to dividing a successive character sequence into a plurality of individual characters or character sequences. A feature word refers to a character or a character sequence having a semantic expression function.

Specifically, the interactive robot may perform feature extraction on the visitor voice data, to obtain to-be-recognized visitor voice feature data, then perform voice framing processing on the to-be-recognized visitor voice feature data based on an acoustic model to obtain a plurality of phonemes, convert the plurality of phonemes obtained through the processing into a character sequence according to a correspondence between candidate characters and phonemes in a candidate character library, and then use a language model to adjust the character sequence obtained through the conversion, to obtain text(s) conforming to a natural language pattern.

The text is a character expression form of voice data. The acoustic model may be a Gaussian Mixture Model (GMM) or a Deep Neural Network (DNN) or the like. The candidate character library includes candidate words and phonemes corresponding to the candidate words. The language model is used for adjusting, according to a natural language pattern, a character sequence obtained through reorganization by using an acoustic model, and is, for example, an N-Gram model (CLM, Chinese Language Model).

Further, the interactive robot may perform word segmentation processing, in a preset word segmentation manner, on the texts obtained by recognizing the visitor voice data, to obtain a plurality of characters or character sequences, and screen out characters or character to sequences with actual semantics from the obtained character sequences as feature words, to form a feature word set. The feature word set may include one or more feature words. The preset word segmentation manner may be based on character matching, based on semantic understanding, or based on a statistical word segmentation manner.

In an embodiment, the interactive robot may perform word segmentation processing in the word segmentation manner based on character matching, split the text obtained by recognizing the visitor voice data into single characters one by one according to an order from front to back or from back to front, and then match the single character with a standard character library. If the matching is successful, the character is obtained as a candidate feature word; and if the matching fails, a character is added to continue the matching process, until all the characters included in the text obtained by recognizing the visitor voice data are matched completely.

In an embodiment, the interactive robot may also perform both forward matching word segmentation and reverse matching word segmentation on the text obtained by recognizing the visitor voice data. When word segmentation results of the two types of word segmentation are the same, a plurality of individual characters or character sequences obtained through the word segmentation is used as the candidate feature words. When the word segmentation results of the two types of word segmentation are different, a number of individual characters or character sequences obtained through the two word segmentation manners is calculated respectively, and the individual characters or character sequences obtained through the word segmentation manner in which the calculated number is less are selected as the candidate feature words.

Further, when the interactive robot screens out the characters or character sequences with actual semantics from the obtained characters or character sequences as the feature words, the interactive robot may specifically filter out stop words from the obtained characters or character sequences. The stop word refers to a type of function character or character sequence included in a natural language. Such type of function character or character sequence has no actual semantics, and includes a mood character or character sequence representing a mood, a connection character or character sequence representing a logical relationship, and the like. Specifically, the mood character is, for example, "?" or "!", the connection character is, for example, "of" or "in", the mood character sequence is, for example, "only" or "just", and the connection character sequence is, for example, "to" or "then".

S306. Determining, according to a topic generation model and the feature word set, a topic to which the text belongs.

During processing of a natural language, the topic generation model means that each word in an article is obtained in a process of selecting a topic according to a probability and selecting a word from the selected topic. The topic in the natural language represents a concept expressed by several words, and is mathematically represented as a condition probability distribution of words in a vocabulary.

Based on the topic generation model, there exists the following formula:

$$p(\text{word} \mid doc) = \sum_{topic} p(\text{word} \mid topic) \times p(topic \mid doc) \quad (1)$$

where word represents a feature word, doc represents a text from which a feature word set is obtained through word segmentation, topic represents a topic, p(word|doc) represents a probability that each feature word appears in the text, p(word|topic) represents a probability that the feature word appears in each topic, and p(topic|doc) represents a probability that the topic appears in each text.

In this embodiment, p(word|doc) at the left of the equation in the foregoing formula (1) is known, and may be directly obtained by counting word frequencies of feature words in a feature word set obtained according to word segmentation of a text, while p(word|topic) and p(topic|doc) are unknown. The topic generation model uses a lot of known p(word|doc) to perform a series of training, to obtain p(word|topic) and p(topic|doc) through reasoning. After p(topic|doc) is obtained, a topic maximizing p(topic|doc) may be used as a topic to which visitor voice data belongs.

The topic generation model may use Probabilistic Latent Semantic Analysis (pLSA) or Latent Dirichlet Allocation (LDA). The pLSA topic generation model mainly uses an Expectation Maximization (EM) algorithm to train reasoning; and the LDA topic generation model uses a Gibbs sampling method to train reasoning.

S308. Separately obtaining appearing probabilities corresponding to feature words in the feature word set when the feature words belong to the determined topic.

The appearing probability corresponding to the feature word when the feature word belongs to the determined topic is a frequency that the feature word appears in a condition of the determined topic. The appearing probability corresponding to the feature word when the feature word belongs to the determined topic reflects a correlation between the feature word and the topic to which the feature word belongs. The correlation between the feature word and the topic to which the feature word belongs has positive correlation with the appearing probability corresponding to the feature word when the feature word belongs to the topic. A larger appearing probability indicates that the feature word is more related to the topic to which the feature word belongs.

Specifically, when training the topic generation model, the interactive robot may determine a preset number of topics in advance, then obtain, for each topic, a lot of texts related to the topic as a training corpus, and perform word segmentation processing on the training corpus, so that all words in the training corpus obtained after the word segmentation construct a word set, to train the perform topic generation model. A text used as a training corpus may be a text crawled from the Internet.

Further, after performing word segmentation on a text obtained by recognizing visitor voice data, to obtain a feature word set, and determining a topic to which the text belongs, the interactive robot counts, for each feature word in the feature word set, a number of times of the current feature word appearing in a training corpus corresponding to the determined topic, to further calculate a word frequency according to the following formula:

$$TF = \frac{N_T}{N_{sum}} \quad (2)$$

where TF represents the word frequency, $N_T$ represents the number of times of the feature word appearing in the training corpus corresponding to the determined topic, and $N_{sum}$ represents a total number of words appearing in the training corpus corresponding to the determined topic.

S310. Selecting a feature word from the feature word set according to the appearing probabilities corresponding to the feature words.

Specifically, for the plurality of feature words included in the feature word set, the interactive robot may select all feature words included in the feature word set for subsequent data processing, or may select some feature words from the feature word set for subsequent data processing.

In an embodiment, the interactive robot may select a feature word whose appearing probability exceeds a preset appearing probability threshold. Specifically, after determining the appearing probabilities corresponding to the feature words, the interactive robot may compare the determined appearing probabilities with the preset appearing probability threshold, and select a feature word whose corresponding appearing probability exceeds the preset appearing probability threshold. The interactive robot may also sort the feature words according to the corresponding appearing probabilities in a descending order, and select a feature word sorted in a front preset proportion.

S312. Obtaining and outputting visitor interactive content corresponding to the selected feature word.

The visitor interactive content is the content to be interacted with the visitor. The visitor interactive content may include at least one of a text, a picture, audio, or a video. The visitor interactive content may be content uniformly set according to the feature words, or may be content related to a visitor identity.

The feature word is associated with the visitor interactive content, to mark the visitor interactive content. The feature word may be used to locate the associated visitor interactive content. One feature word may be associated with one or more pieces of visitor interactive content. A plurality of feature words may be associated with one piece of visitor interactive content.

In an embodiment, the interactive robot may set the visitor interactive content in advance, associate the visitor interactive content with the feature word, and store the set visitor interactive content to a data library or file. The visitor interactive content is read from the data library or file when needed. After selecting the feature word, the interactive robot may pull the visitor interactive content associated with the feature word. The visitor interactive content may be visitor interactive content that may be output directly, or may be a visitor interactive content template to be complemented.

In an embodiment, a visitor interactive device may invoke the display screen to output the visitor interactive content. The visitor interactive content is, for example, a text, a picture, or a video. The visitor interactive device may further obtain style data corresponding to the visitor interactive content, to display the visitor interactive content on the display screen according to the style data. The visitor interactive device may also invoke the loudspeaker to output the visitor interactive content. The visitor interactive content is, for example, audio.

In the foregoing interactive method, after visitor voice data is obtained, and word segmentation is performed on a text obtained by recognizing the visitor voice data, to obtain a feature word set, a topic to which the visitor voice data belongs may be accurately determined by using a topic generation model and the feature word set obtained through the word segmentation when the sparsity of the visitor voice data is high, visitor interactive content corresponding to a suitable feature word is automatically selected according to appearing probabilities of feature words in the feature word set when the feature words belong to the determined topic, and the visitor interactive content is output, thereby avoiding a workload introduced in the need of a lot of human participations, and improving efficiency of interacting with visitors and accuracy of the outputted visitor interactive content.

Figure 4:
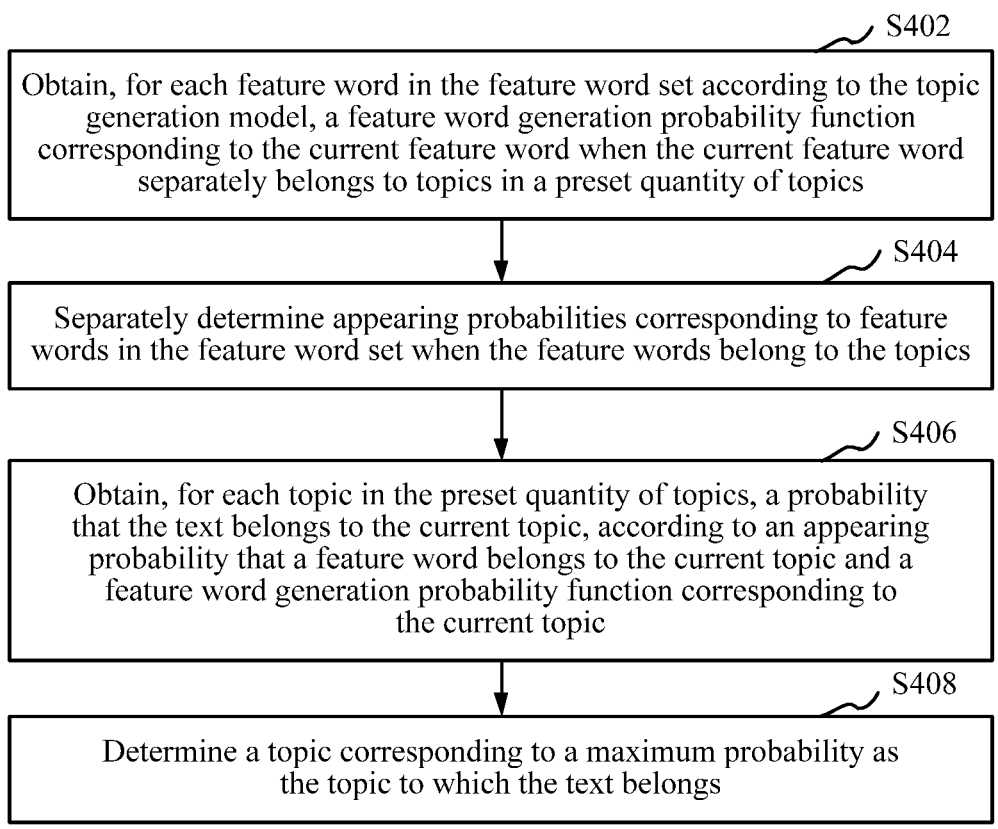
FIG. 4 is a flowchart of a step of determining, according to a topic generation model and a feature word set, a topic to which a text belongs according to an embodiment of the present disclosure.

As shown in FIG. 4, in an embodiment, S306 may specifically include the followings.

S402. Obtaining, for each feature word in the feature word set according to the topic generation model, a feature word generation probability function corresponding to the current feature word when the current feature word separately belongs to topics in a preset number of topics.

A main function of the topic generation model is to extract an understandable and relatively stable latent semantic structure. The topic generation model uses a bag-of-words model, and regards each text as a word frequency vector, to convert text information into number information easy for modeling. A main assumption of the topic generation model is that a series of topics are linked to a series of word and text sets, and the topic may be regarded as a probability distribution of characters and words. In this embodiment, the LDA topic generation model is used to determine the topic to which the visitor voice data belongs.

In an embodiment, the obtaining, for each feature word in the feature word set according to the topic generation model, a feature word generation probability function corresponding to the current feature word when the current feature word separately belongs to topics in a preset number of topics includes: selecting, for each feature word in the feature word set according to the topic generation model, a topic to which the current feature word belongs, according to a polynomial distribution of the preset number of topics and the feature words, and generating the current feature word in the selected topic condition according to a polynomial distribution of texts and the topics, to construct the feature word generation probability function corresponding to the current feature word when the current feature word separately belongs to the topics in the preset number of topics.

Specifically, the interactive robot may select a preset number of topics in advance, obtain a plurality of texts corresponding to the selected topics to construct a training corpus library, initialize a polynomial distribution of the preset number of topics and the feature words and a polynomial distribution of the preset number of topics and the texts, and optimize the two polynomial distributions according to training corpora in the training corpus library.

Figure 5:
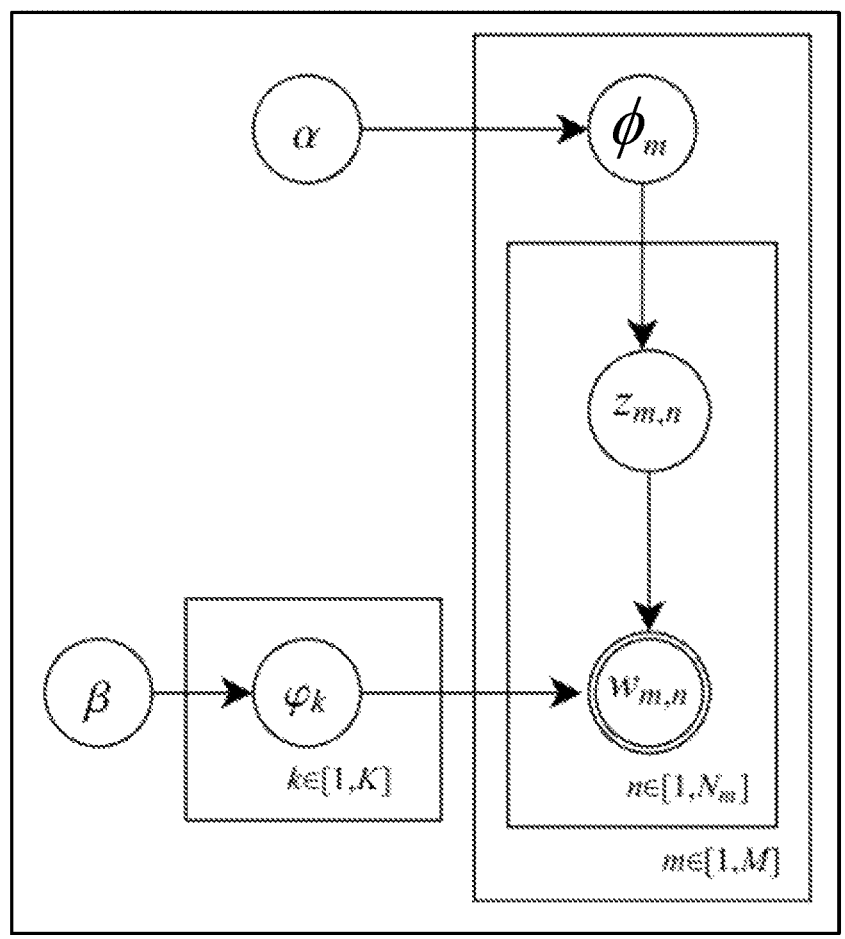
FIG. 5 is a schematic diagram of a graph model of a text generation process in a topic generation model according to an embodiment of the present disclosure.

For each text in the training corpus library, the LDA topic generation model defines the following generation process: It is given that a training corpus library including M texts, each text in the training corpus library corresponds to a polynomial distribution of K (K is given in advance through a method such as repeated experiments) topics, and the polynomial distribution is marked as $\phi$. Each topic further corresponds to a polynomial distribution of V words in a vocabulary, and the polynomial distribution is marked as $\varphi$. $\phi$ and $\varphi$ are respectively Dirichlet prior distributions with hyper-parameters $\alpha$ and $\beta$. For each word w in a text m, a topic z is extracted from a polynomial distribution $\phi$ corresponding to the text m, and then a word w is extracted from a polynomial distribution $\varphi$ corresponding to the topic z. A text m is generated by repeating the process for $N_m$ times. Herein, $N_m$ is a total number of words in the text m, and $m \in [1,M]$ and $k \in [1,K]$, while the generation process may be represented as a graph model shown in FIG. 5.

In an embodiment, the interactive robot may select, for each feature word in the feature word set according to the topic generation model, a topic to which the current feature word belongs, according to a polynomial distribution of the preset number of topics and the feature words, and generate the current feature word in the selected topic condition according to a polynomial distribution of texts and the topics, to construct a feature word generation probability function. The polynomial distribution of the preset number of topics and the feature words is $\varphi_k \sim \text{Dirichlet}(\beta)$, and $\varphi_k \sim \text{Dirichlet}(\beta)$ represents that $\varphi_k$ obeys a Dirichlet distribution using $\beta$ as a hyper-parameter. The polynomial distribution of texts and the topics is $\phi_m \sim \text{Dirichlet}(\alpha)$, and $\phi_m \sim \text{Dirichlet}(\alpha)$ represents that $\phi_m$ obeys a Dirichlet distribution using $\alpha$ as a hyper-parameter.

Further, the interactive robot may generate, according to the distribution $\phi_m \sim \text{Dirichlet}(\alpha)$, topics $z_{m,n} \sim \phi_m$ to which the current feature word n belongs. Current feature words $w_{m,n} \sim \varphi_{z_{m,n}}$ are generated according to the distribution $\varphi_k \sim \text{Dirichlet}(\beta)$. As can be learned, a generation probability of an $n^{th}$ feature word t in an $m^{th}$ text may be represented by using the following formula:

$$p(w_{m,n} = t \mid \varphi, \phi) = \sum_{k=1}^{K} p(w_{m,n} = t \mid \varphi_k) p(z_{m,n} = k \mid \phi_m) \quad (3)$$

where m is an identifier of a text, n is an identifier of a feature word in a feature word set obtained according to word segmentation of the text, t represents a value of a feature word n in a text m, k represents an identifier of a topic, K is a preset number of topics; $w_{m,n}$ represents a feature word n in a text m, and $z_{m,n}$ represents a topic of an $n^{th}$ feature word in the text m; and $p(w_{m,n}=t \mid \varphi, \phi)$ represents a probability that the feature word $w_{m,n}$ is t, $p(z_{m,n}=k \mid \phi_m)$ represents a probability that the topic $z_{m,n}$ to which the current feature word belongs is k in the condition of $\phi_m$, and $p(w_{m,n}=t \mid \varphi_k)$ represents a probability that the current feature word $w_{m,n}$ is t in the condition of $\varphi_k$. For example, t is an actual character or character string such as weather, clearness, or a game.

Thus, by using a relationship between topics and feature words obtained through training in the topic generation model for processing the natural language, and a relationship between texts and topics, a feature word generation probability function corresponding to a feature word included in the visitor voice data when the feature word belongs to topics is obtained, to use the probability function to predict a topic to which the visitor voice data belongs, to further properly determine a topic to be expressed by a visitor from the perspective of probability.

S404. Separately determining appearing probabilities corresponding to feature words in the feature word set when the feature words belong to the topics.

Specifically, $p(w_{m,n}=t \mid \varphi, \phi)$ at the left of the equation in the foregoing formula (3) is equal to a probability that the current feature word t appears in the text m, that is, a word frequency of the current feature word t in the text m.

S406. Obtaining, for each topic in the preset number of topics, a probability that the text belongs to the current topic, according to an appearing probability that a feature word belongs to the current topic and a feature word generation probability function corresponding to the current topic.

Specifically, M texts are known, where appearing probabilities of feature words are also known. Values of $p(z_{m,n}=k \mid \phi_m)$ and $p(w_{m,n}=t \mid \varphi_k)$ may be obtained through training by using a Gibbs sampling method, and then $p(w_{m,n}=t \mid \varphi_k)$ may be used to obtain a probability that the text obtained by recognizing the visitor voice data belongs to a topic k.

S408. Determining a topic corresponding to a maximum probability as the topic to which the text belongs.

Specifically, the interactive robot may sort probabilities that the text obtained by recognizing the visitor voice data belongs to the topics in the preset number of topics in a descending order, to obtain a topic corresponding to a maximum probability, and determine the topic as the topic to which the text obtained by recognizing the visitor voice data.

In other embodiments, a plurality of topics with larger probabilities may be further selected as the topic to which the text obtained by recognizing the visitor voice data belongs.

In this embodiment, the topic generation model for processing a natural language is applied to perform visitor intention locating on the visitor voice data. After a topic to be expressed by a visitor is determined, candidate precise interactions may be performed based on the topic expressed by the visitor, thereby improving accuracy of interacting with visitors.

In an embodiment, S306 includes: determining, according to a topic generation model and the feature word set, a topic to which the text belongs; and a probability that the text belongs to the determined topic. S310 includes: obtaining, for each feature word in the feature word set, a topic influence value corresponding to the current feature word, according to a probability that the text belongs to the determined topic and an appearing probability that the current feature word belongs to the determined topic; and selecting the feature word from the feature word set according to the topic influence value corresponding to the feature word.

The topic influence value is a quantized value of a correlation between a feature word and a topic. In a topic condition, a larger topic influence value corresponding to a feature word indicates a higher correlation between the feature word and the topic. The topic influence value corresponding to the feature word has positive correlation with the probability that the text belongs to the determined topic, and has positive correlation with the appearing probability that the feature word belongs to the determined topic.

Specifically, the interactive robot may directly use the product of the probability that the text belongs to the determined topic and the appearing probability that the current feature word belongs to the determined topic as a topic influence value corresponding to the current feature word; or may use a value obtained by performing calculation on the probability that the text belongs to the determined topic and the appearing probability that the current feature word belongs to the determined topic as a public influence value corresponding to a public identifier.

In an embodiment, the topic influence value corresponding to the feature word may be specifically calculated by using a positive correlation function of two variables whose independent variables are the probability that the text belongs to the determined topic and the appearing probability that the current feature word belongs to the determined topic. A positive correlation coefficient of the positive correlation function may be a randomly-set value.

In an embodiment, the interactive robot may select a feature word whose topic influence value exceeds a preset topic influence value threshold. After determining topic influence values corresponding to the feature words, the interactive robot may specifically compare the determined topic influence values with the preset topic influence value threshold, and select a feature word whose corresponding topic influence value exceeds the preset topic influence value threshold. The interactive robot may also sort the feature words according to the corresponding topic influence values in a descending order, and select a feature word sorted in a front preset proportion.

Thus, during selection of the feature word, the probability that the text belongs to the determined topic and the appearing probability that the current feature word belongs to the determined topic are used as an evaluation basis of the topic influence value corresponding to the feature word, so that the evaluation for the topic influence value corresponding to the feature word is more scientific, to select a feature word that can better reflect a visitor intention, thereby improving efficiency and accuracy of interacting with visitors.

In an embodiment, S312 includes: locally searching for offline visitor interactive content corresponding to the selected feature word; sending the selected feature word to a server; receiving visitor interactive content that is generated in real time according to the selected feature word and that is returned by the server; and taking the intersection or merge of the offline visitor interactive content and the received visitor interactive content, and then outputting the intersection or merge of the contents.

Specifically, the interactive robot may select adaptive keywords for visitor interactive scenarios, search for corresponding corpora for the keywords, and generate visitor interactive content corresponding to the keywords in the visitor interactive scenarios according to the corpora, to construct an offline visitor interactive content library. After selecting a feature word representing a visitor intention, the interactive robot may compare the feature word with the keywords in the offline visitor interactive content library, to obtain visitor interactive content corresponding to a keyword matching the feature word. The interactive robot may directly output the obtained offline visitor interactive content.

After selecting the feature word, the interactive robot may also send the selected feature word to a server. After obtaining the selected feature word, the server crawls a corpus related to the feature word on the Internet in real time, extracts target content from the corpus to generate visitor interactive content, and then feeds back the visitor interactive content to the interactive robot. The interactive robot may directly output the visitor interactive content returned by the server.

After obtaining the offline visitor interactive content and receiving the visitor interactive content returned by the server, the interactive robot may further integrate the found offline visitor interactive content and the received visitor interactive content, and then output the integrated visitor interactive content. The integrating the offline visitor interactive content and the received visitor interactive content may be directly taking the intersection of them or taking the merge of them.

In this embodiment, offline and online manners are provided to obtain the visitor interactive content to output. The visitor interactive content obtained in the offline manner can significantly improve response efficiency of the interactive robot, and the visitor interactive content obtained in the online manner can enable the output visitor interactive content to be flexible and diverse.

In an embodiment, before obtaining visitor voice data, the interactive method further includes the following steps: obtaining an image frame; generating a visitor tendency movement instruction when performing face detection on the image frame to obtain that the image frame includes a facial image; and moving according to the visitor tendency movement instruction.

In an embodiment, the interactive robot may acquire the image frame by using a camera in the current view of the camera, to obtain the acquired image frame. The view of the camera may change as a posture and a position of the interactive robot change. The interactive robot may also specifically acquire the image frame according to a fixed or dynamic frame rate, to obtain the acquired image frame. The fixed or dynamic frame rate can make the image frame form successive dynamic images according to the fixed or dynamic frame rate, so that the interactive robot may track a particular target in the successive dynamic images. The interactive robot may further invoke the camera to start a camera scanning mode, to scan the particular target in the current view in real time, and generate an image frame in real time according to a frame rate, to obtain the generated image frame.

The camera may be an internal camera of the interactive robot or an external camera associated with the interactive robot. The camera may be a monocular camera, a binocular camera, or a Red-Green-Blue-Deep (RGB-D) camera or the like.

Further, after obtaining the image frame, the interactive robot may extract image data included in the image frame, and detect whether the image data includes facial feature data. If detecting that the image data includes facial feature data, the interactive robot determines that the image frame includes a facial image. Alternatively, after obtaining the image frame, the interactive robot may send the image frame to a server, and the server completes a face detection process of the image frame, and then returns a detection result about whether the image frame includes a facial image to the interactive robot. The detection result may include a probability that the image frame includes a facial image and a coordinate region of the facial image.

Further, when performing face detection on the image frame to obtain that the image frame includes a facial image, the interactive robot may determine a target position of the facial image and a current initial position of the interactive robot, and generate a visitor tendency movement instruction according to the initial position and the target position. The visitor tendency movement instruction is used for driving the interactive robot to move toward visitors.

In an embodiment, the process of generating a visitor tendency movement instruction includes: determining a target node corresponding to the facial image in a map; selecting an initial node matching the image frame from the map, where a feature of the image frame matches a feature of a node image corresponding to the initial node; selecting, according to the initial node and the target node, a visitor tendency movement path from paths included in the map; and generating the visitor tendency movement instruction according to the selected visitor tendency movement path.

The map is a feature distribution map constructed according to image frames acquired from a natural space by the interactive robot. The interactive robot may construct a corresponding map for the natural space based on Simultaneous Localization And Mapping (SLAM). The map constructed by the interactive robot based on SLAM may be specifically a three-dimensional point map. The node is a position in a map space to which a position of the image frame acquired from the natural space by the interactive robot is projected. The target node is a node projecting a position of a target in the natural space to the map. For example, if coordinates of the target in the natural space are A (x1, y1, z1), and coordinates obtained after A is projected to the map space are B (x2, y2, z2), B is a node of the target in the map.

In an embodiment, the map may include several nodes, and each node has one corresponding node image. The map may further include feature points extracted from the node image. A map including feature points and nodes is a three-dimensional reconstruction for a scenario in the natural space. Specifically, projection transformation of a projection matrix is performed on three-dimensional points in a three-dimensional scenario in the natural space, to obtain pixel points in a two-dimensional image frame of a camera plane of the interactive robot. Then, inverse projection transformation of the projection matrix is performed on the pixel points in the two-dimensional image frame, to obtain three-dimensional feature points in a three-dimensional reconstruction scenario in the map.

When detecting that the image frame includes a facial image, the interactive robot may calculate a position of the facial image in the map. Specifically, the interactive robot may determine a coordinate position of the facial image in the image frame, calculate a position of the facial image in the map according to a projection matrix adaptive to the camera of the interactive robot, and search the nodes included in the map for a node corresponding to the position obtained through calculation, to obtain the target node.

Further, the node image is an image acquired by the interactive robot at a position in the natural space in a projection relationship with a node in the map. Features of the image may be one of or a combination of a color feature, a texture feature, and a shape feature. When constructing the map, the interactive robot may extract features of node images corresponding to the nodes in the map, and store corresponding nodes relative to the extracted features of the node images to a data library or a buffer. In an embodiment, the interactive robot may traverse the features of the node images corresponding to the nodes in the map, and determine whether a traversed feature of the node image matches a feature of the image frame. When determining that the traversed feature of the node image matches the feature of the image frame, the interactive robot may obtain a node corresponding to the traversed feature of the node image as the initial node.

Further, the map may include paths formed by the nodes in the map. The interactive robot may select a path from the paths formed by the nodes in the map by using the initial node as a start point and the target node as an end point, to obtain a visitor tendency movement path, and generate a visitor tendency movement instruction according to the selected visitor tendency movement path. In an embodiment, there may be one or more paths using the initial node as a start point and the target node as an end point in the map. When the path using the initial node as a start point and the target node as an end point is unique, the interactive robot may directly obtain the path as the visitor tendency movement path. When the path using the initial node as a start point and the target node as an end point is not unique, the interactive robot may randomly select a path as the visitor tendency movement path, or may obtain a path including the fewest nodes as the visitor tendency movement path.

In one embodiment, when it is detected that the obtained image frame includes a facial image, a target node corresponding to the facial image may be automatically determined in the map, and a position of the target in the map is located. Then, an initial node matching the image frame may be selected from the map based on a matching relationship between a feature of the image frame and features of node images corresponding to nodes in the map, and a current position of the host in the map may be located. Then, according to the current node and the target node, a visitor tendency movement path may be selected from the paths included in the map, and a visitor tendency movement instruction may be generated. In this way, by matching features between images, locating in the map may be completed, thereby avoiding environmental impact caused by sensing signal locating, and improving accuracy of motion control.

Thus, when obtaining an image frame and detecting that the obtained image frame includes a facial image, the interactive robot automatically generates a visitor tendency movement instruction and moves toward visitors, to actively interact with the visitors, thereby improving efficiency of interacting with the visitors.

In an embodiment, the interactive method further includes constructing a map: selecting an image frame from image frames acquired according to a time sequence; determining whether a feature of the selected image frame matches a preset feature of a node image; obtaining the selected image frame as a node image when the feature of the selected image frame matches the feature of the node image; determining a node corresponding to the obtained node image in the map; and storing a feature of the obtained node image corresponding to the determined node.

Figure 6:
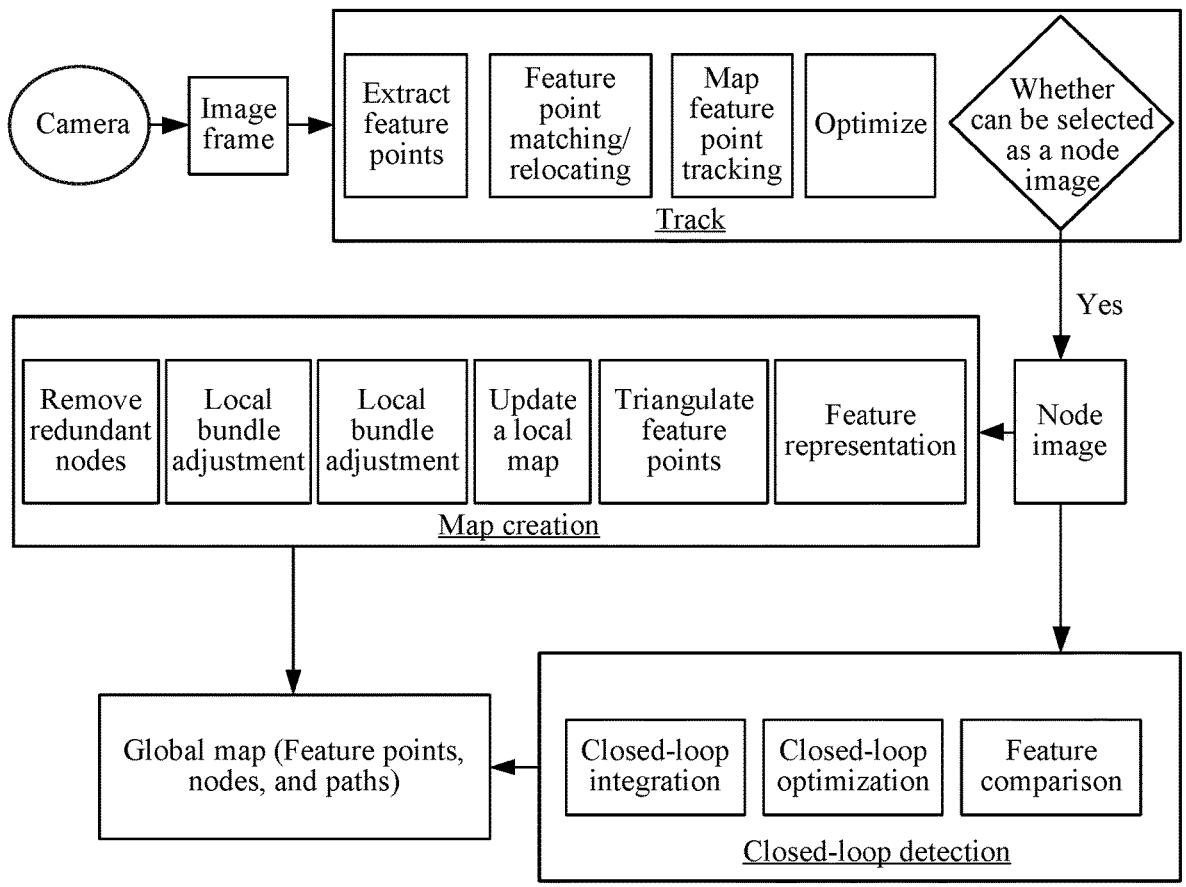
FIG. 6 is a schematic flowchart of a map creation process according to an embodiment of the present disclosure.

FIG. 6 shows a schematic flowchart of a map creation process in an embodiment. Referring to FIG. 6, the map creation process includes three parts: tracking, map construction, and closed-loop detection. After obtaining a map creation instruction, the interactive robot may acquire an image frame according to a fixed or dynamic frame rate. After the image frame is acquired, feature points of the image frame are extracted, and the extracted feature points are matched with feature points of a node image corresponding to a new node in a map. When the matching between the extracted feature points and the feature points of the node image corresponding to the new node in the map fails, the interactive robot may re-obtain the acquired image frame to perform relocating.

When the extracted feature points and the feature points of the node image corresponding to the new node in the map are matched successfully, a node corresponding to the acquired image frame in the map is evaluated according to the new node in the map. Then, the interactive robot may track feature points matching the acquired image frame in the map, and optimize the node corresponding to the image frame in the map according to the matching features. After the acquired image frame is optimized completely, whether the feature points of the image frame match preset feature points of the node image is determined, and if not, the interactive robot may re-obtain the acquired image frame to perform feature point matching.

If the feature points of the image frame match the preset feature points of the node image, the interactive robot may obtain the image frame as a new node image. The interactive robot may extract feature points of the new node image, represent the extracted feature points according to a preset uniform format, then determine positions of the feature points of the new node image in the map according to a triangulation measurement algorithm, to update a local map, and then perform local bundle adjustment, to remove redundant nodes corresponding to a node image whose similarity is higher than a preset similarity threshold.

After obtaining the image frame as the new node image, the interactive robot may perform closed-loop detection asynchronously. The feature of the new node image is compared with a feature of a node image corresponding to an existing node. When the similarity between the feature of the new node image and the feature of the node image corresponding to the existing node is higher than the preset similarity threshold, the interactive robot may determine that an acquisition position of the new node image in a natural space is consistent with an acquisition position of the node image corresponding to the existing node in the natural space, that is, a closed loop exists. Then, according to a node corresponding to the new node image, the interactive robot may generate a circular path including nodes with consistent positions in the map, and perform closed-loop optimization and closed-loop integration. Finally, a global map including feature points, nodes, and paths is obtained.

Figure 7:
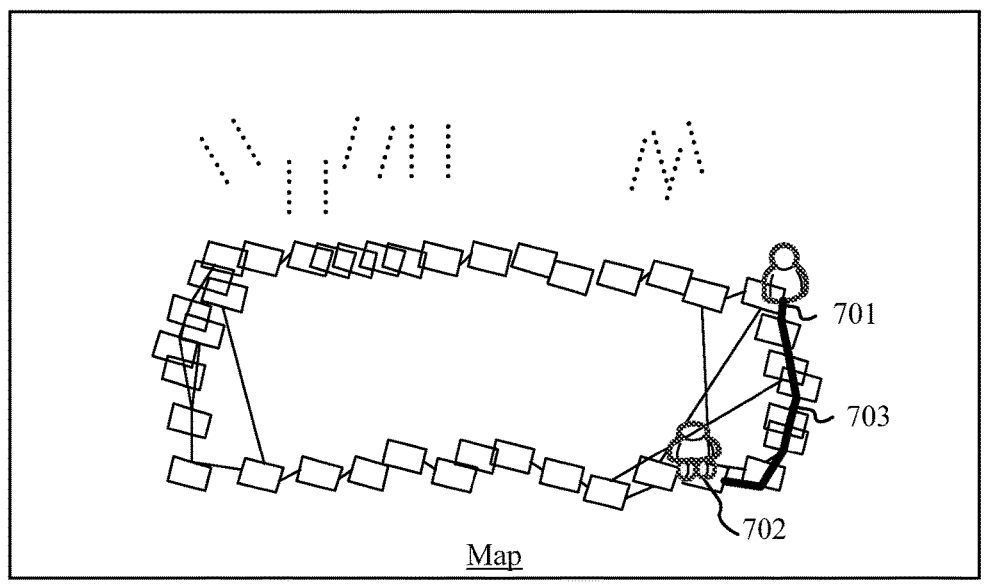
FIG. 7 is a schematic diagram of selecting a visitor tendency movement path in a map according to an embodiment of the present disclosure.

FIG. 7 shows a schematic diagram of selecting a visitor tendency movement path in a map in an embodiment. Referring to FIG. 7, the schematic diagram includes a target node 701, an initial node 702, and a visitor tendency movement path 703. After determining that the target node 701, namely, a position of a target, and the initial node 702, namely, a position of the host, an interactive robot selects the visitor tendency movement path 703 in a map by using the initial node 702 as a start point and the target node 701 as an end point.

Figure 8:
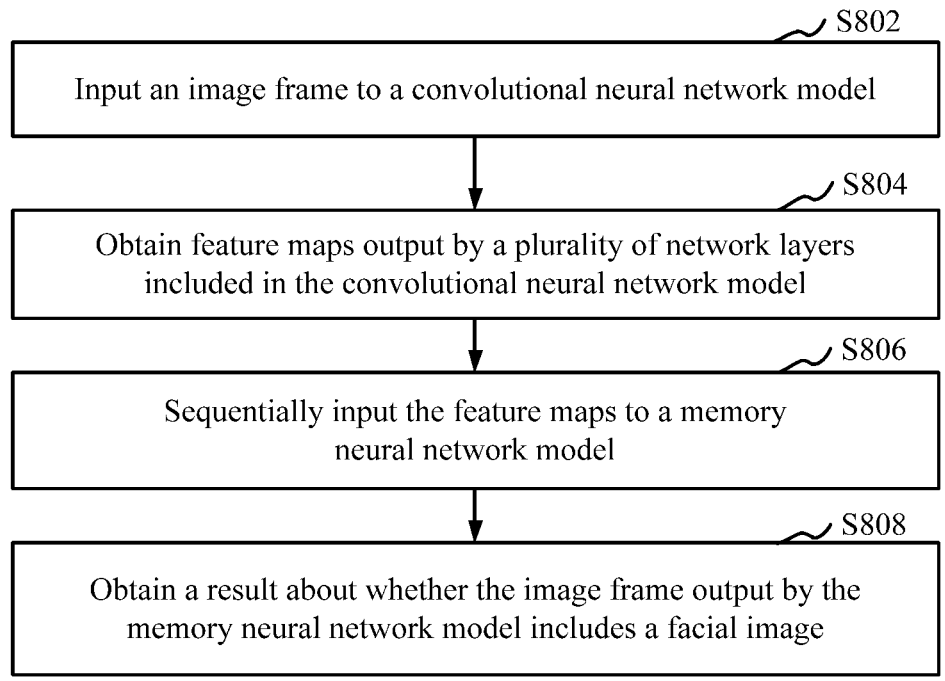
FIG. 8 is a schematic flowchart of a face detection step according to an embodiment of the present disclosure.

As shown in FIG. 8, in an embodiment, the interactive method further includes a face detection process, and the face detection process specifically includes the followings.

S802. Inputting an image frame to a convolutional neural network model.

The convolutional neural network model is a complicated network model formed by interconnecting a plurality of layers. The neural network model may include a plurality of feature transform layers, and each feature transform layer has a corresponding non-linear variation operator. There may be a plurality of non-linear variation operators at each layer. One non-linear variation operator in each feature transform layers performs non-linear variation on an input image, to obtain a feature map as an operation result.

Specifically, the convolutional neural network model is a model that is used for facial feature extraction and that is obtained through learning and training by using an image including a facial image as training data. After obtaining the image frame, the interactive robot inputs the image frame to the convolutional neural network model, and performs facial feature extraction on the image frame by using the convolutional neural network model. The facial feature may be one of or a plurality of features such as an outline, a hair style, glasses, a nose, and a month used for reflecting the gender and the face of a person, and distances between facial organs.

In an embodiment, the convolutional neural network model is a model that is used for image feature extraction and that is obtained through learning and training by using an image as training data. After obtaining the image frame, the interactive robot inputs the image frame to the convolutional neural network model, and performs image feature extraction on the image frame by using the convolutional neural network model.

S804. Obtaining feature maps outputted by a plurality of network layers included in the convolutional neural network model.

Specifically, the interactive robot may obtain feature maps outputted by a plurality of network layers included in the convolutional neural network model. The feature map is constructed by response values obtained by processing an input image by a non-linear variation operator. Features extracted from different network layers are different. The interactive robot may use a feature map outputted by a convolutional neural network for facial feature extraction to determine facial feature data corresponding to the input image. The interactive robot may use a feature map outputted by a convolutional neural network for image feature extraction to determine image feature data corresponding to an input image, and further determine whether the image feature data includes facial feature data.

For example, the interactive robot may use a 52-layer deep residual network model to perform image processing, and extract feature maps outputted by 4 fully connected layers included in the deep residual network model as a subsequent input.

S806. Sequentially inputting the feature maps to a memory neural network model.

The memory neural network model is a neural network model that may process a sequence input. The memory neural network model is a recursive neural network model. The memory neural network model may be specifically a Long Short-Term Memory (LSTM) neural network. Specifically, the interactive robot may sequentially input the obtained feature maps to the memory neural network model, to perform facial feature detection.

S808. Obtaining a result about whether the image frame outputted by the memory neural network model includes a facial image.

Specifically, the interactive robot may obtain a face detection result obtained by performing comprehensive processing according to the input feature maps by the memory neural network model. The face detection result includes a probability that a facial image exists and a coordinate region of the facial image in the image frame.

In an embodiment, after extracting the face detection result, the interactive robot may further filter out, according to a coordinate region of a facial image included in the face detection result in the image frame, a face detection result that an overlapping region exceeds a preset overlapping threshold and obtain a coordinate region of the facial image in the image frame according to a face detection result reserved after the filtering.

In an embodiment, the memory neural network model may use a rectangular window to move in an input feature map according to a preset direction and a preset step size, to perform window scanning, extract facial feature data in the scanned window image during scanning, and obtain, according to extracted facial feature image, a probability that a facial image exists in the scanned window image. A coordinate region, in the image frame, of a window image whose probability obtained through calculation is sorted front is stored, and a subsequently input feature map continues to be processed.

Figure 9:
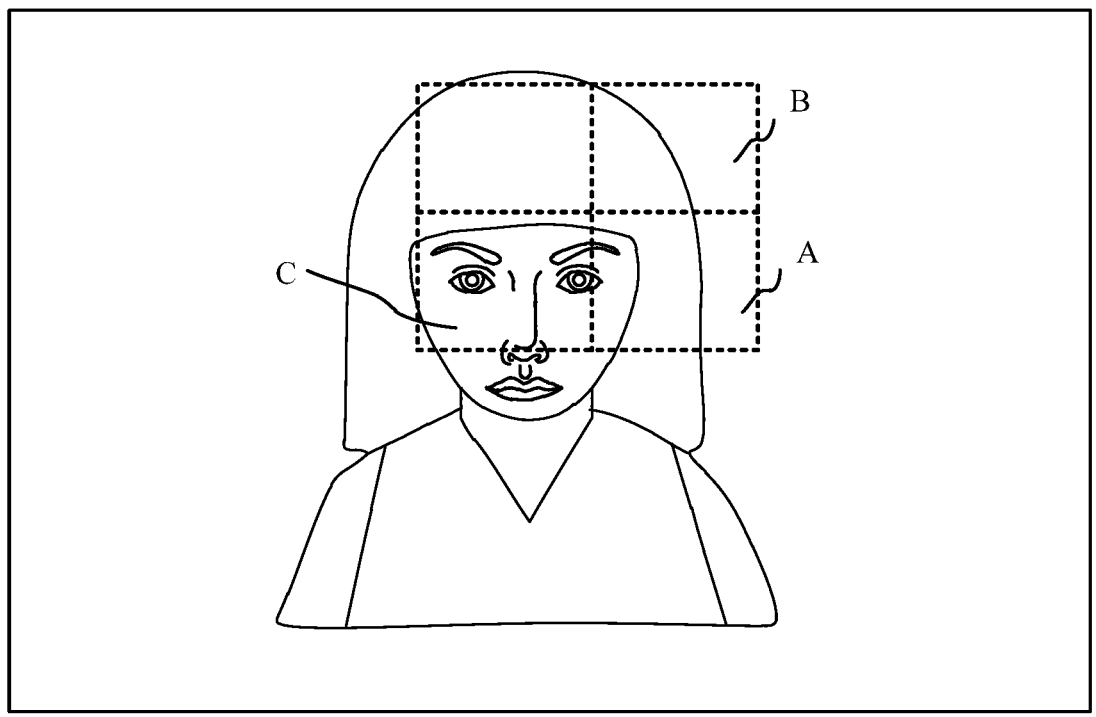
FIG. 9 is a schematic diagram of performing face recognition on a facial image according to an embodiment of the present disclosure.

FIG. 9 shows a schematic diagram of performing face recognition on a facial image in an embodiment. Referring to FIG. 9, a memory neural network model used by an interactive robot scans and analyzes an input feature map according to a rectangular window, to obtain a probability $P_A$ that a facial image exists and that corresponds to a rectangular window A, a probability $P_B$ that a facial image exists and that corresponds to a rectangular window B, and a probability $P_C$ that a facial image exists and that corresponds to a rectangular window C. In this case, $P_C > P_A > P_B$, and the memory neural network model may record the rectangular window C corresponding to $P_C$, continue to scan and analyze a subsequently input feature map according to the rectangular window, synthesize a plurality of analyses to obtain the rectangular windows and a corresponding probability that a facial image exists, and output a probability that an image frame obtained by the interactive robot includes a facial image and a coordinate region of the facial image in the image frame.

In one embodiment, image features are fully extracted by a plurality of network layers included in the convolutional neural network model and, then, the features extracted by the plurality of network layers are input to the memory neural network model for comprehensive processing, so that the face detection is more accurate.

In an embodiment, the interactive method further includes a face recognition process, and the face recognition process specifically includes: extracting facial feature data of the facial image; querying, according to the facial feature data, for a preset facial image matching the facial image; and obtaining a visitor identity recognition result according to the preset facial image. S312 specifically includes: obtaining and outputting visitor interactive content that corresponds to the selected feature word and that is associated with the visitor identity recognition result.

The visitor identity recognition result is data used for reflecting a visitor identity. The visitor identity may be a name, a social position, job information or the like of a visitor.

In an embodiment, the interactive robot is provided with a preset facial image library, and the preset facial image library includes several preset facial images. When detecting that the image frame includes a facial image, the interactive robot may compare the facial image in the image frame with a preset facial image included in the preset facial image library, and detect whether the facial image in the image frame matches the preset facial image. When the facial image in the image frame matches the preset facial image, the interactive robot may determine that the facial image included in the image frame and the preset facial image are the same figure image, and obtain visitor identity information corresponding to the preset facial image as the visitor identity recognition result.

The preset facial image may be a real facial image used for reflecting a corresponding target. From personal information uploaded by a target and historically published picture information, an image custom selected by the corresponding target or a picture analyzed and selected by the system automatically is used as a corresponding preset facial image.

In an embodiment, the detecting, by the interactive robot, whether the facial image in the image frame matches the preset facial image may be specifically calculating the similarity between the facial image in the image frame and the preset facial image. The interactive robot may first extract a feature of the facial image in the image frame and a feature of the preset facial image, to calculate a difference between the two features. A larger difference between the features indicates a lower similarity, and a smaller difference between the features indicates a higher similarity. When calculating the similarity between the facial image in the image frame and the preset facial image, the interactive robot may use an acceleration algorithm suitable for an image processor, to improve an operation rate.

In an embodiment, after determining that the image frame includes a facial image, the interactive robot may extract facial feature data from the image data, and then compare the extracted facial feature data with facial feature data corresponding to preset facial images in the preset facial image library, to obtain the visitor identity recognition result.

In an embodiment, there may be one or more facial images included in the image frame obtained by detecting the image frame by the interactive robot. The interactive robot may determine a ratio of the facial image included in the image frame to the image frame, and extract facial feature data of a facial image whose ratio exceeds a preset proportion; and/or determine definition of the facial image included in the image frame, and extract facial feature data of a facial image whose definition exceeds a definition threshold. Then, the interactive robot recognizes the facial image from which the facial feature data has been extracted.

Then, the interactive robot may obtain and output visitor interactive content that corresponds to the selected feature word and that is associated with the visitor identity recognition result.

In an embodiment, the interactive robot may set the visitor interactive content in advance, associate the visitor interactive content with the visitor identifier and the feature word respectively, and store the set visitor interactive content to a data library or file. The visitor interactive content is read from the data library or file when needed. After recognizing the visitor identity recognition result, the interactive robot may pull visitor interactive content that is associated with the visitor identifier corresponding to the visitor identity recognition result and that corresponds to the selected feature word. The visitor interactive content may be visitor interactive content that may be output directly, or may be a visitor interactive content template to be complemented.

In one embodiment, personalized visitor interactive content is set according to visitor identity information, so that content interacting with visitors is more plentiful, and presenting manners of the interactive content are diverse.

In other embodiments, the foregoing face detection and face recognition processes may be performed on a server. Performing face detection and face recognition by using the server may enable the recognition result or the detection result to be more accurate.

In an embodiment, the interactive robot may perform priority sorting on the preset facial images included in the preset facial image library in advance according to a particular sorting manner. For example, the priority sorting is performed on the preset facial images according to social positions or job information of actual persons corresponding to the preset facial images. When recognizing a plurality of visitor identity recognition results from the obtained image frames, the interactive robot selects a visitor identity recognition result corresponding to a preset facial image with the highest priority, to perform response.

Figure 10:
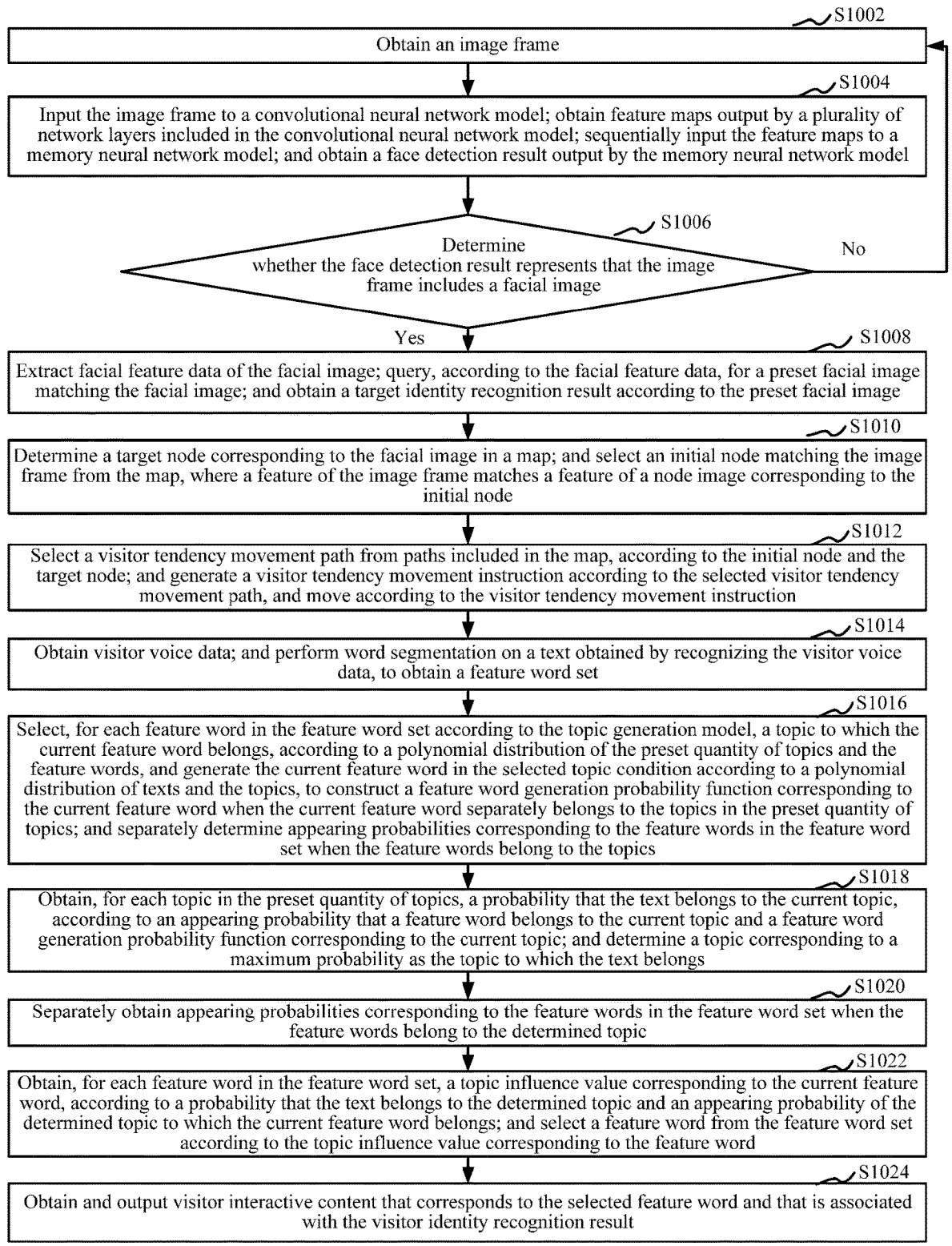
FIG. 10 is a schematic flowchart of an interactive method according to another embodiment of the present disclosure.

As shown in FIG. 10, in an embodiment, the interactive method specifically includes the followings.

S1002. Obtaining an image frame.

S1004. Inputting the image frame to a convolutional neural network model; obtain feature maps outputted by a plurality of network layers included in the convolutional neural network model; sequentially input the feature maps to a memory neural network model; and obtain a face detection result outputted by the memory neural network model.

S1006. Determining whether the face detection result represents that the image frame includes a facial image; it yes, proceeding to S1008; and if not, returning to S1002.

S1008. Extracting facial feature data of the facial image; querying, according to the facial feature data, for a preset facial image matching the facial image; and obtaining a visitor identity recognition result according to the preset facial image.

S1010. Determining a target node corresponding to the facial image in a map; and select an initial node matching the image frame from the map, where a feature of the image frame matches a feature of a node image corresponding to the initial node.

S1012. Selecting a visitor tendency movement path from paths included in the map, according to the initial node and the target node; and generating a visitor tendency movement instruction according to the selected visitor tendency movement path, and moving according to the visitor tendency movement instruction.

S1014. Obtaining visitor voice data; and performing word segmentation on a text obtained by recognizing the visitor voice data, to obtain a feature word set.

S1016. Selecting, for each feature word in the feature word set according to the topic generation model, a topic to which the current feature word belongs, according to a polynomial distribution of the preset number of topics and the feature words, and generating the current feature word in the selected topic condition according to a polynomial distribution of texts and the topics, to construct a feature word generation probability function corresponding to the current feature word when the current feature word separately belongs to the topics in the preset number of topics; and separately determine appearing probabilities corresponding to the feature words in the feature word set when the feature words belong to the topics.

S1018. Obtaining, for each topic in the preset number of topics, a probability that the text belongs to the current topic, according to an appearing probability that a feature word belongs to the current topic and a feature word generation probability function corresponding to the current topic; and determining a topic corresponding to a maximum probability as the topic to which the text belongs.

S1020. Separately obtaining appearing probabilities corresponding to the feature words in the feature word set when the feature words belong to the determined topic.

S1022. Obtaining, for each feature word in the feature word set, a topic influence value corresponding to the current feature word, according to a probability that the text belongs to the determined topic and an appearing probability of the determined topic to which the current feature word belongs; and selecting a feature word from the feature word set according to the topic influence value corresponding to the feature word.

S1024. Obtaining and outputting visitor interactive content that corresponds to the selected feature word and that is associated with the visitor identity recognition result.

In one embodiment, after visitor voice data is obtained, and word segmentation is performed on a text obtained by recognizing the visitor voice data, to obtain a feature word set, a topic to which the visitor voice data belongs may be accurately determined by using a topic generation model and the feature word set obtained through the word segmentation when the sparsity of the visitor voice data is high, visitor interactive content corresponding to a suitable feature word is automatically selected according to appearing probabilities of feature words in the feature word set when the feature words belong to the determined topic, and the visitor interactive content is output, thereby avoiding a workload introduced in the need of a lot of human participations, and improving efficiency of interacting with visitors and accuracy of the output visitor interactive content.

Figure 11:
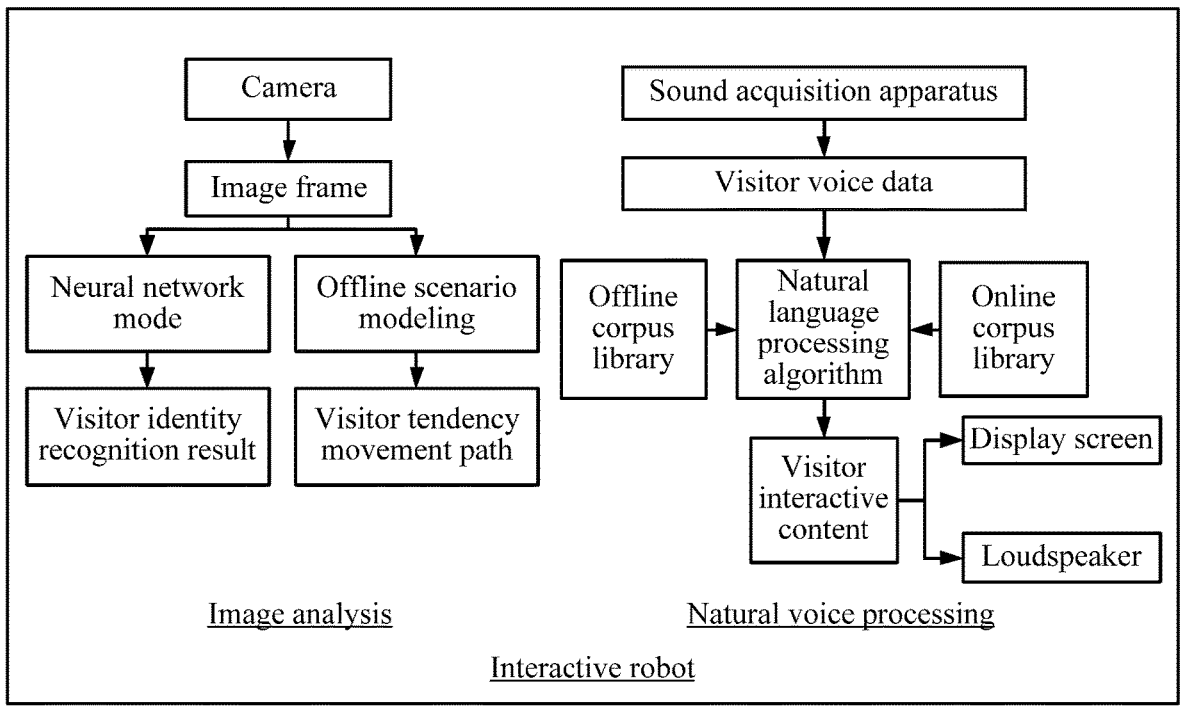
FIG. 11 is an architectural diagram of an interactive robot according to an embodiment of the present disclosure.

FIG. 11 shows an architectural diagram of an interactive robot configured to implement the foregoing embodiments in an embodiment. Referring to FIG. 11, the interactive robot includes a camera for acquiring an image frame, a sound acquisition apparatus for acquiring visitor voice data, and a display screen or a loudspeaker for outputting visitor interactive content. The interactive robot includes an image analysis part and a natural voice processing part. After acquiring the image frame by using the camera, the interactive robot obtains the image frame, inputs the image frame to a neural network model (including a convolutional neural network model, a memory neural network model, and the like) to perform face detection, and performs face recognition when detecting that the image frame includes a facial image, to obtain a visitor identity recognition result. When detecting that the image frame includes a facial image, the interactive robot may asynchronously select, according to a map obtained through offline scenario modeling, a visitor tendency movement path moving toward visitors, and generate a visitor tendency movement instruction and move. Then, the interactive robot obtains visitor voice data, determines, by using a natural language processing algorithm (a topic generation model or the like) in combination with a corpus library (an online corpus library and an offline corpus library), an intention to be expressed by a visitor, and selects a feature word to obtain suitable visitor interactive content.

Figure 12:
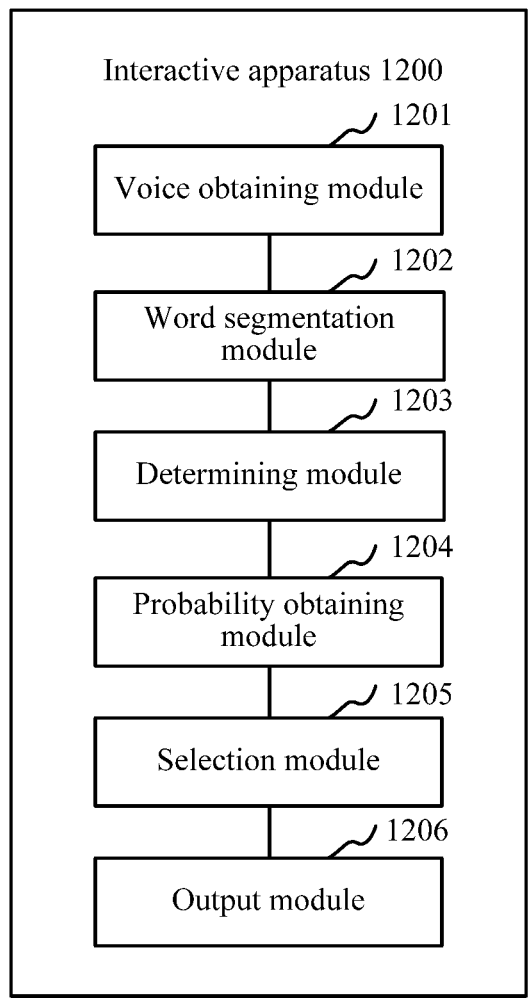
FIG. 12 is a structural block diagram of an interactive terminal according to an embodiment of the present disclosure.

As shown in FIG. 12, in an embodiment, an interactive terminal 1200 is provided. Referring to FIG. 12 and FIG. 2, the interactive terminal 1200 includes one or more processors and one or more memory.

The memory stores at least one application program, and the at least one application program is suitable for being loaded by the processor, to perform the following operations: obtaining visitor voice data; performing word segmentation on a text obtained by recognizing the visitor voice data, to obtain a feature word set; determining, according to a topic generation model and the feature word set, a topic to which the text belongs; separately obtaining appearing probabilities corresponding to feature words in the feature word set when the feature words belong to the determined topic; selecting a feature word from the feature word set according to the appearing probabilities corresponding to the feature words; and obtaining and outputting visitor interactive content corresponding to the selected feature word.

In the interactive terminal 1200, after visitor voice data is obtained, and word segmentation is performed on a text obtained by recognizing the visitor voice data, to obtain a feature word set, a topic to which the visitor voice data belongs may be accurately determined by using a topic generation model and the feature word set obtained through the word segmentation when the sparsity of the visitor voice data is high, visitor interactive content corresponding to a suitable feature word is automatically selected according to appearing probabilities of feature words in the feature word set when the feature words belong to the determined topic, and the visitor interactive content is output, thereby avoiding a workload introduced in the need of a lot of human participations, and improving efficiency of interacting with visitors and accuracy of the output visitor interactive content.

Further, as shown in FIG. 12, in the interactive terminal 1200, various modules are also included or implemented. The interactive terminal 1200 may also include a voice obtaining module 1201, a word segmentation module 1202, a determining module 1203, a probability obtaining module 1204, a selection module 1205, and an output module 1206. In an embodiment, the determining module 1203 is further configured to: obtain, for each feature word in the feature word set according to the topic generation model, a feature word generation probability function corresponding to the current feature word when the current feature word separately belongs to topics in a preset number of topics; separately determine appearing probabilities corresponding to the feature words in the feature word set when the feature words belong to the topics; obtain, for each topic in the preset number of topics, a probability that the text belongs to the current topic, according to an appearing probability that a feature word belongs to the current topic and a feature word generation probability function corresponding to the current topic; and determine a topic corresponding to a maximum probability as the topic to which the text belongs.

In one embodiment, the topic generation model for processing a natural language is applied to perform visitor intention locating on the visitor voice data. After a topic to be expressed by a visitor is determined, candidate precise interactions may be performed based on the topic expressed by the visitor, thereby improving accuracy of interacting with visitors.

In an embodiment, the determining module 1203 is further configured to: select, for each feature word in the feature word set according to the topic generation model, a topic to which the current feature word belongs, according to a polynomial distribution of the preset number of topics and the feature words, and generate the current feature word in the selected topic condition according to a polynomial distribution of texts and the topics, to construct the feature word generation probability function corresponding to the current feature word when the current feature word separately belongs to the topics in the preset number of topics.

In one embodiment, by using a relationship between topics and feature words obtained through training in the topic generation model for processing the natural language, and a relationship between texts and topics, a feature word generation probability function corresponding to a feature word included in the visitor voice data when the feature word belongs to topics is obtained, to use the probability function to predict a topic to which the visitor voice data belongs, to further properly determine a topic to be expressed by a visitor from the perspective of probability.

In an embodiment, the selection module 1205 is further configured to: obtain, for each feature word in the feature word set, a topic influence value corresponding to the current feature word, according to a probability that the text belongs to the determined topic and an appearing probability that the current feature word belongs to the determined topic; and select the feature word from the feature word set according to the topic influence value corresponding to the feature word.

In one embodiment, during selection of the feature word, the probability that the text belongs to the determined topic and the appearing probability that the current feature word belongs to the determined topic are used as an evaluation basis of the topic influence value corresponding to the feature word, so that the evaluation for the topic influence value corresponding to the feature word is more scientific, to select a feature word that can better reflect a visitor intention, thereby improving efficiency and accuracy of interacting with visitors.

In an embodiment, the output module 1206 is further configured to: locally search for offline visitor interactive content corresponding to the selected feature word; send the selected feature word to a server; receive visitor interactive content that is generated in real time according to the selected feature word and that is returned by the server; and take the intersection or union/merge of the found offline visitor interactive content and the received visitor interactive content and then output the intersection or union/merge thereof.

In one embodiment, offline and online manners are provided to obtain the visitor interactive content to output. The visitor interactive content obtained in the offline manner can significantly improve response efficiency of the interactive robot, and the visitor interactive content obtained in the online manner can enable the output visitor interactive content to be flexible and diverse.

Further, in an embodiment, for the interactive terminal 1200, the at least one application program is suitable for being loaded by the processor, to perform the following operations: obtaining an image frame; and generating a visitor tendency movement instruction when performing face detection on the image frame to obtain that the image frame includes a facial image; and moving according to the visitor tendency movement instruction.

In one embodiment, when obtaining an image frame and detecting that the obtained image frame includes a facial image, the interactive terminal automatically generates a visitor tendency movement instruction and moves toward visitors, to actively interact with the visitors, thereby improving efficiency of interacting with the visitors.

Figure 13:
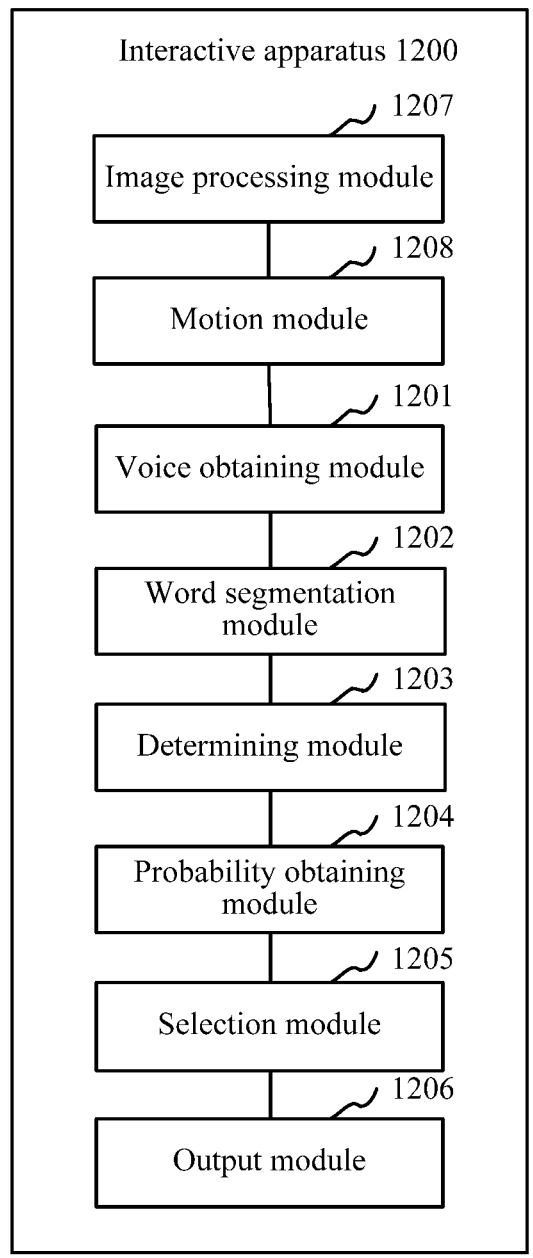
FIG. 13 is a structural block diagram of an interactive terminal according to another embodiment of the present disclosure.

As shown in FIG. 13, the interactive apparatus 1200 also includes/implements an image processing module 1207 and a motion module 1208. In an embodiment, the at least one application program is suitable for being loaded by the processor, to perform the following operations: determining a target node corresponding to the facial image in a map; selecting an initial node matching the image frame from the map, where a feature of the image frame matches a feature of a node image corresponding to the initial node; selecting, according to the initial node and the target node, a visitor tendency movement path from paths included in the map; and generating the visitor tendency movement instruction according to the selected visitor tendency movement path.

In one embodiment, when it is detected that the obtained image frame includes a facial image, a target node corresponding to the facial image may be automatically determined in the map, and a position of the target in the map is located. Then, an initial node matching the image frame may be selected from the map based on a matching relationship between a feature of the image frame and features of node images corresponding to nodes in the map, and a current position of the host in the map may be located. Then, according to the current node and the target node, a visitor tendency movement path may be selected from the paths included in the map, and a visitor tendency movement instruction may be generated. In this way, by matching features between images, locating in the map may be completed, thereby avoiding environmental impact caused by sensing signal locating, and improving accuracy of motion control.

In an embodiment, the at least one application program is suitable for being loaded by the processor, to perform the following operations: inputting the image frame to a convolutional neural network model; obtaining feature maps outputted by a plurality of network layers included in the convolutional neural network model; sequentially inputting the feature maps to a memory neural network model; and obtaining a result about whether the image frame outputted by the memory neural network model includes a facial image.

In one embodiment, image features are fully extracted by a plurality of network layers included in the convolutional neural network model, and then, the features extracted by the plurality of network layers are input to the memory neural network model for comprehensive processing, so that the face detection is more accurate.

In an embodiment, the at least one application program is suitable for being loaded by the processor, to perform the following operations: extracting facial feature data of the facial image; querying, according to the facial feature data, for a preset facial image matching the facial image; obtaining a visitor identity recognition result according to the preset facial image; and obtaining and outputting visitor interactive content that corresponds to the selected feature word and that is associated with the visitor identity recognition result.

In one embodiment, personalized visitor interactive content is set according to visitor identity information, so that content interacting with visitors is more plentiful, and presenting manners of the interactive content are diverse.

In an embodiment, a computer-readable storage medium is provided. The computer-readable storage medium stores computer-readable instructions, and the computer-readable instructions, when executed by a processor, cause the processor to perform the following steps: obtaining visitor voice data; performing word segmentation on a text obtained by recognizing the visitor voice data, to obtain a feature word set; determining, according to a topic generation model and the feature word set, a topic to which the text belongs; separately obtaining appearing probabilities corresponding to feature words in the feature word set when the feature words belong to the determined topic; selecting a feature word from the feature word set according to the appearing probabilities corresponding to the feature words; and obtaining and outputting visitor interactive content corresponding to the selected feature word.

In an embodiment, the determining, according to a topic generation model and the feature word set, a topic to which the text belongs includes: obtaining, for each feature word in the feature word set according to the topic generation model, a feature word generation probability function corresponding to the current feature word when the current feature word separately belongs to topics in a preset number of topics; separately determining appearing probabilities corresponding to the feature words in the feature word set when the feature words belong to the topics; obtaining, for each topic in the preset number of topics, a probability that the text belongs to the current topic, according to an appearing probability that a feature word belongs to the current topic and a feature word generation probability function corresponding to the current topic; and determining a topic corresponding to a maximum probability as the topic to which the text belongs.

In an embodiment, the obtaining, for each feature word in the feature word set according to the topic generation model, a feature word generation probability function corresponding to the current feature word when the current feature word separately belongs to topics in a preset number of topics includes: selecting, for each feature word in the feature word set according to the topic generation model, a topic to which the current feature word belongs, according to a polynomial distribution of the preset number of topics and the feature words, and generating the current feature word in the selected topic condition according to a polynomial distribution of texts and the topics, to construct the feature word generation probability function corresponding to the current feature word when the current feature word separately belongs to the topics in the preset number of topics.

In an embodiment, the selecting a feature word from the feature word set according to the appearing probabilities corresponding to the feature words includes: obtaining, for each feature word in the feature word set, a topic influence value corresponding to the current feature word, according to a probability that the text belongs to the determined topic and an appearing probability that the current feature word belongs to the determined topic; and selecting the feature word from the feature word set according to the topic influence value corresponding to the feature word.

In an embodiment, the obtaining and outputting visitor interactive content corresponding to the selected feature word includes: locally searching for offline visitor interactive content corresponding to the selected feature word; sending the selected feature word to a server; receiving visitor interactive content that is generated in real time according to the selected feature word and that is returned by the server; and taking the intersection or union/merge of the found offline visitor interactive content and the received visitor interactive content and then outputting the intersection or union/merge.

In an embodiment, before performing the obtaining visitor voice data, the computer-readable instructions further cause the processor to perform the following steps: obtaining an image frame; generating a visitor tendency movement instruction when performing face detection on the image frame to obtain that the image frame includes a facial image; and moving according to the visitor tendency movement instruction.

In an embodiment, the generating a visitor tendency movement instruction includes: determining a target node corresponding to the facial image in a map; selecting an initial node matching the image frame from the map, where a feature of the image frame matches a feature of a node image corresponding to the initial node; selecting, according to the initial node and the target node, a visitor tendency movement path from paths included in the map; and generating the visitor tendency movement instruction according to the selected visitor tendency movement path.

In an embodiment, after performing the obtaining an image frame, the computer-readable instructions further cause the processor to perform the following steps: inputting the image frame to a convolutional neural network model; obtaining feature maps outputted by a plurality of network layers included in the convolutional neural network model; sequentially inputting the feature maps to a memory neural network model; and obtaining a result about whether the image frame outputted by the memory neural network model includes a facial image.

In an embodiment, after performing the generating a visitor tendency movement instruction when performing face detection on the image frame to obtain that the image frame includes a facial image, the computer-readable instructions further cause the processor to perform the following steps: extracting facial feature data of the facial image; querying, according to the facial feature data, for a preset facial image matching the facial image; and obtaining a visitor identity recognition result according to the preset facial image. The obtaining and outputting visitor interactive content corresponding to the selected feature word includes: obtaining and outputting visitor interactive content that corresponds to the selected feature word and that is associated with the visitor identity recognition result.

In the foregoing storage medium, after visitor voice data is obtained, and word segmentation is performed on a text obtained by recognizing the visitor voice data, to obtain a feature word set, a topic to which the visitor voice data belongs may be accurately determined by using a topic generation model and the feature word set obtained through the word segmentation when the sparsity of the visitor voice data is high, visitor interactive content corresponding to a suitable feature word is automatically selected according to appearing probabilities of feature words in the feature word set when the feature words belong to the determined topic, and the visitor interactive content is output, thereby avoiding a workload introduced in the need of a lot of human participations, and improving efficiency of interacting with visitors and accuracy of the output visitor interactive content.

In an embodiment, an interactive robot is provided, including a memory and a processor. The memory stores computer-readable instructions, and the computer-readable instructions, when executed by the processor, cause the processor to perform the following steps: obtaining visitor voice data; performing word segmentation on a text obtained by recognizing the visitor voice data, to obtain a feature word set; determining, according to a topic generation model and the feature word set, a topic to which the text belongs; separately obtaining appearing probabilities corresponding to feature words in the feature word set when the feature words belong to the determined topic; selecting a feature word from the feature word set according to the appearing probabilities corresponding to the feature words; and obtaining and outputting visitor interactive content corresponding to the selected feature word.

In an embodiment, the determining, according to a topic generation model and the feature word set, a topic to which the text belongs includes: obtaining, for each feature word in the feature word set according to the topic generation model, a feature word generation probability function corresponding to the current feature word when the current feature word separately belongs to topics in a preset number of topics; separately determining appearing probabilities corresponding to the feature words in the feature word set when the feature words belong to the topics; obtaining, for each topic in the preset number of topics, a probability that the text belongs to the current topic, according to an appearing probability that a feature word belongs to the current topic and a feature word generation probability function corresponding to the current topic; and determining a topic corresponding to a maximum probability as the topic to which the text belongs.

In an embodiment, the obtaining, for each feature word in the feature word set according to the topic generation model, a feature word generation probability function corresponding to the current feature word when the current feature word separately belongs to topics in a preset number of topics includes: selecting, for each feature word in the feature word set according to the topic generation model, a topic to which the current feature word belongs, according to a polynomial distribution of the preset number of topics and the feature words, and generating the current feature word in the selected topic condition according to a polynomial distribution of texts and the topics, to construct the feature word generation probability function corresponding to the current feature word when the current feature word separately belongs to the topics in the preset number of topics.

In an embodiment, the selecting a feature word from the feature word set according to the appearing probabilities corresponding to the feature words includes: obtaining, for each feature word in the feature word set, a topic influence value corresponding to the current feature word, according to a probability that the text belongs to the determined topic and an appearing probability that the current feature word belongs to the determined topic; and selecting the feature word from the feature word set according to the topic influence value corresponding to the feature word.

In an embodiment, the obtaining and outputting visitor interactive content corresponding to the selected feature word includes: locally searching for offline visitor interactive content corresponding to the selected feature word; sending the selected feature word to a server; receiving visitor interactive content that is generated in real time according to the selected feature word and that is returned by the server; and taking the intersection or union/merge of the found offline visitor interactive content and the received visitor interactive content and then outputting the intersection or union/merge.

In an embodiment, before performing the obtaining visitor voice data, the computer-readable instructions further cause the processor to perform the following steps: obtaining an image frame; generating a visitor tendency movement instruction when performing face detection on the image frame to obtain that the image frame includes a facial image; and moving according to the visitor tendency movement instruction.

In an embodiment, the generating a visitor tendency movement instruction includes: determining a target node corresponding to the facial image in a map; selecting an initial node matching the image frame from the map, where a feature of the image frame matches a feature of a node image corresponding to the initial node; selecting, according to the initial node and the target node, a visitor tendency movement path from paths included in the map; and generating the visitor tendency movement instruction according to the selected visitor tendency movement path.

In an embodiment, after performing the obtaining an image frame, the computer-readable instructions further cause the processor to perform the following steps: inputting the image frame to a convolutional neural network model; obtaining feature maps outputted by a plurality of network layers included in the convolutional neural network model; sequentially inputting the feature maps to a memory neural network model; and obtaining a result about whether the image frame outputted by the memory neural network model includes a facial image.

In an embodiment, after performing the generating a visitor tendency movement instruction when performing face detection on the image frame to obtain that the image frame includes a facial image, the computer-readable instructions further cause the processor to perform the following steps: extracting facial feature data of the facial image; querying, according to the facial feature data, for a preset facial image matching the facial image; and obtaining a visitor identity recognition result according to the preset facial image. The obtaining and outputting visitor interactive content corresponding to the selected feature word includes: obtaining and outputting visitor interactive content that corresponds to the selected feature word and that is associated with the visitor identity recognition result.

In the foregoing interactive robot, after visitor voice data is obtained, and word segmentation is performed on a text obtained by recognizing the visitor voice data, to obtain a feature word set, a topic to which the visitor voice data belongs may be accurately determined by using a topic generation model and the feature word set obtained through the word segmentation when the sparsity of the visitor voice data is high, visitor interactive content corresponding to a suitable feature word is automatically selected according to appearing probabilities of feature words in the feature word set when the feature words belong to the determined topic, and the visitor interactive content is output, thereby avoiding a workload introduced in the need of a lot of human participations, and improving efficiency of interacting with visitors and accuracy of the output visitor interactive content.

In an embodiment, a computer device is provided, including a memory and a processor. The memory stores computer-readable instructions, and the computer-readable instructions, when executed by the processor, cause the processor to perform the following steps: obtaining visitor voice data; performing word segmentation on a text obtained by recognizing the visitor voice data, to obtain a feature word set; determining, according to a topic generation model and the feature word set, a topic to which the text belongs; separately obtaining appearing probabilities corresponding to feature words in the feature word set when the feature words belong to the determined topic; selecting a feature word from the feature word set according to the appearing probabilities corresponding to the feature words; and obtaining and outputting visitor interactive content corresponding to the selected feature word.

In an embodiment, the determining, according to a topic generation model and the feature word set, a topic to which the text belongs includes: obtaining, for each feature word in the feature word set according to the topic generation model, a feature word generation probability function corresponding to the current feature word when the current feature word separately belongs to topics in a preset number of topics; separately determining appearing probabilities corresponding to the feature words in the feature word set when the feature words belong to the topics; obtaining, for each topic in the preset number of topics, a probability that the text belongs to the current topic, according to an appearing probability that a feature word belongs to the current topic and a feature word generation probability function corresponding to the current topic; and determining a topic corresponding to a maximum probability as the topic to which the text belongs.

In an embodiment, the obtaining, for each feature word in the feature word set according to the topic generation model, a feature word generation probability function corresponding to the current feature word when the current feature word separately belongs to topics in a preset number of topics includes: selecting, for each feature word in the feature word set according to the topic generation model, a topic to which the current feature word belongs, according to a polynomial distribution of the preset number of topics and the feature words, and generating the current feature word in the selected topic condition according to a polynomial distribution of texts and the topics, to construct the feature word generation probability function corresponding to the current feature word when the current feature word separately belongs to the topics in the preset number of topics.

In an embodiment, the selecting a feature word from the feature word set according to the appearing probabilities corresponding to the feature words includes: obtaining, for each feature word in the feature word set, a topic influence value corresponding to the current feature word, according to a probability that the text belongs to the determined topic and an appearing probability that the current feature word belongs to the determined topic; and selecting the feature word from the feature word set according to the topic influence value corresponding to the feature word.

In an embodiment, the obtaining and outputting visitor interactive content corresponding to the selected feature word includes: locally searching for offline visitor interactive content corresponding to the selected feature word; sending the selected feature word to a server; receiving visitor interactive content that is generated in real time according to the selected feature word and that is returned by the server; and taking the intersection or union/merge of the found offline visitor interactive content and the received visitor interactive content and then outputting the intersection or union/merge.

In an embodiment, before performing the obtaining visitor voice data, the computer-readable instructions further cause the processor to perform the following steps: obtaining an image frame; generating a visitor tendency movement instruction when performing face detection on the image frame to obtain that the image frame includes a facial image; and moving according to the visitor tendency movement instruction.

In an embodiment, the generating a visitor tendency movement instruction includes: determining a target node corresponding to the facial image in a map; selecting an initial node matching the image frame from the map, where a feature of the image frame matches a feature of a node image corresponding to the initial node; selecting, according to the initial node and the target node, a visitor tendency movement path from paths included in the map; and generating the visitor tendency movement instruction according to the selected visitor tendency movement path.

In an embodiment, after performing the obtaining an image frame, the computer-readable instructions further cause the processor to perform the following steps: inputting the image frame to a convolutional neural network model; obtaining feature maps outputted by a plurality of network layers included in the convolutional neural network model; sequentially inputting the feature maps to a memory neural network model; and obtaining a result about whether the image frame outputted by the memory neural network model includes a facial image.

In an embodiment, after performing the generating a visitor tendency movement instruction when performing face detection on the image frame to obtain that the image frame includes a facial image, the computer-readable instructions further cause the processor to perform the following steps: extracting facial feature data of the facial image; querying, according to the facial feature data, for a preset facial image matching the facial image; and obtaining a visitor identity recognition result according to the preset facial image. The obtaining and outputting visitor interactive content corresponding to the selected feature word includes: obtaining and outputting visitor interactive content that corresponds to the selected feature word and that is associated with the visitor identity recognition result.

In the foregoing computer device, after visitor voice data is obtained, and word segmentation is performed on a text obtained by recognizing the visitor voice data, to obtain a feature word set, a topic to which the visitor voice data belongs may be accurately determined by using a topic generation model and the feature word set obtained through the word segmentation when the sparsity of the visitor voice data is high, visitor interactive content corresponding to a suitable feature word is automatically selected according to appearing probabilities of feature words in the feature word set when the feature words belong to the determined topic, and the visitor interactive content is output, thereby avoiding a workload introduced in the need of a lot of human participations, and improving efficiency of interacting with visitors and accuracy of the output visitor interactive content.

A person of ordinary skill in the art may understand that all or some of the processes of the methods in the foregoing description may be implemented by a computer program instructing relevant hardware. The program may be stored in a non-volatile computer-readable storage medium. When the program is run, the processes of the foregoing methods in the embodiments are performed. The storage medium may be a magnetic disk, an optical disc, a read-only memory (ROM), or the like.

The technical features of the foregoing embodiments may be randomly combined. For the purpose of concise descriptions, not all possible combinations of the technical features in the foregoing description are described, but as long as combinations of the technical features do not conflict each other, the combinations of the technical features should be considered as falling within the scope of this specification.

The foregoing embodiments only show several implementations of the present disclosure and are described in detail, but they should not be construed as a limit to the patent scope of the present disclosure. It should be noted that, a person of ordinary skill in the art may make various changes and improvements without departing from the ideas of the present disclosure, which shall fall within the protection scope of the present disclosure. Therefore, the protection scope of the patent of the present disclosure shall be topic to the claims.

What is claimed is:

1. An interactive method for an interactive terminal, comprising:
   obtaining visitor voice data of a visitor;
   performing word segmentation on a text obtained by recognizing the visitor voice data, to obtain a feature word set;
   determining, according to a topic generation model and the feature word set, a determined topic to which the text belongs;
   separately obtaining appearing probabilities corresponding to feature words in the feature word set when the feature words belong to the determined topic;
   selecting a feature word from the feature words of the feature word set according to the appearing probabilities corresponding to the feature words; and
   obtaining and outputting visitor interactive content corresponding to the selected feature word.

2. The method according to claim 1, wherein the determining, according to a topic generation model and the feature word set, a determined topic to which the text belongs comprises:
   obtaining, for each feature word in the feature word set according to the topic generation model, a feature word generation probability function corresponding to the current feature word when the current feature word separately belongs to topics in a preset number of topics;
   separately determining appearing probabilities corresponding to the feature words in the feature word set when the feature words belong to the topics;
   obtaining, for each topic in the preset number of topics, a probability that the text belongs to the current topic, according to an appearing probability that a feature word belongs to the current topic and a feature word generation probability function corresponding to the current topic; and
   determining a topic corresponding to a maximum probability as the determined topic to which the text belongs.

3. The method according to claim 2, wherein the obtaining, for each feature word in the feature word set according to the topic generation model, a feature word generation probability function corresponding to the current feature word when the current feature word separately belongs to topics in a preset number of topics comprises:
   selecting, for each feature word in the feature word set according to the topic generation model, a topic to which the current feature word belongs, according to a polynomial distribution of the preset number of topics and the feature words, and generating the current feature word in the selected topic condition according to a polynomial distribution of texts and the topics, to construct the feature word generation probability function corresponding to the current feature word when the current feature word separately belongs to the topics in the preset number of topics.

4. The method according to claim 2, wherein the selecting a feature word from the feature word set according to the appearing probabilities corresponding to the feature words comprises:
   obtaining, for each feature word in the feature word set, a topic influence value corresponding to the current feature word, according to a probability that the text belongs to the determined topic and an appearing probability that the current feature word belongs to the determined topic; and
   selecting the feature word from the feature word set according to the topic influence value corresponding to the feature word.

5. The method according to claim 1, wherein the obtaining and outputting visitor interactive content corresponding to the selected feature word comprises:
   locally searching for offline visitor interactive content corresponding to the selected feature word;
   sending the selected feature word to a server;
   receiving visitor interactive content that is generated in real time according to the selected feature word and that is returned by the server; and
   taking the intersection or merge of the found offline visitor interactive content and the received visitor interactive content and then outputting the intersection or merge of the found offline visitor interactive content and the received visitor interactive content.

6. The method according to claim 1, wherein before the obtaining visitor voice data, the method further comprises:
   obtaining an image frame;
   generating a visitor tendency movement instruction when performing face detection on the image frame to obtain that the image frame comprises a facial image; and
   moving towards to the visitor according to the visitor tendency movement instruction.

7. The method according to claim 6, wherein the generating a visitor tendency movement instruction comprises:
   determining a target node corresponding to the facial image in a map;
   selecting an initial node matching the image frame from the map, wherein a feature of the image frame matches a feature of a node image corresponding to the initial node;
   selecting, according to the initial node and the target node, a visitor tendency movement path from paths comprised in the map; and
   generating the visitor tendency movement instruction according to the selected visitor tendency movement path.

8. The method according to claim 6, wherein after the obtaining an image frame, the method further comprises:
   inputting the image frame to a convolutional neural network model;
   obtaining feature maps outputted by a plurality of network layers comprised in the convolutional neural network model;
   sequentially inputting the feature maps to a memory neural network model; and
   obtaining a result about whether the image frame outputted by the memory neural network model comprises a facial image.

9. The method according to claim 6, wherein after the generating a visitor tendency movement instruction when performing face detection on the image frame to obtain that the image frame comprises a facial image, the method further comprises:
  extracting facial feature data of the facial image;
  querying, according to the facial feature data, for a preset facial image matching the facial image; and
  obtaining a visitor identity recognition result according to the preset facial image; and
  the obtaining and outputting visitor interactive content corresponding to the selected feature word comprises:
  obtaining and outputting visitor interactive content that corresponds to the selected feature word and that is associated with the visitor identity recognition result.

10. An interactive terminal, comprising: one or more processors and one or more memories, the memory storing at least one application program, and the at least one application program being suitable for being loaded by the processor, to perform:
  obtaining visitor voice data of a visitor;
  performing word segmentation on a text obtained by recognizing the visitor voice data, to obtain a feature word set;
  determining, according to a topic generation model and the feature word set, a determined topic to which the text belongs;
  separately obtaining appearing probabilities corresponding to feature words in the feature word set when the feature words belong to the determined topic;
  selecting a feature word from the feature words of the feature word set according to the appearing probabilities corresponding to the feature words; and
  obtaining and outputting visitor interactive content corresponding to the selected feature word.

11. The interactive terminal according to claim 10, wherein
  the at least one application program is further suitable for being loaded by the processor to perform:
  obtaining, for each feature word in the feature word set according to the topic generation model, a feature word generation probability function corresponding to the current feature word when the current feature word separately belongs to topics in a preset number of topics;
  separately determining appearing probabilities corresponding to the feature words in the feature word set when the feature words belong to the topics;
  obtaining, for each topic in the preset number of topics, a probability that the text belongs to the current topic, according to an appearing probability that a feature word belongs to the current topic and a feature word generation probability function corresponding to the current topic; and
  determining a topic corresponding to a maximum probability as the determined topic to which the text belongs.

12. The interactive terminal according to claim 11, wherein
  the at least one application program is further suitable for being loaded by the processor, to perform:
  selecting, for each feature word in the feature word set according to the topic generation model, a topic to which the current feature word belongs, according to a polynomial distribution of the preset number of topics and the feature words, and generating the current feature word in the selected topic condition according to a polynomial distribution of texts and the topics, to construct the feature word generation probability function corresponding to the current feature word when the current feature word separately belongs to the topics in the preset number of topics.

13. The interactive terminal according to claim 11, wherein
  the at least one application program is further suitable for being loaded by the processor, to perform:
  obtaining, for each feature word in the feature word set, a topic influence value corresponding to the current feature word, according to a probability that the text belongs to the determined topic and an appearing probability that the current feature word belongs to the determined topic; and selecting the feature word from the feature word set according to the topic influence value corresponding to the feature word.

14. The interactive terminal according to claim 10, wherein
  the at least one application program is further suitable for being loaded by the processor, to perform:
  locally searching for offline visitor interactive content corresponding to the selected feature word; sending the selected feature word to a server; receiving visitor interactive content that is generated in real time according to the selected feature word and that is returned by the server; and taking the intersection or merge of the found offline visitor interactive content and the received visitor interactive content and then outputting the intersection or merge of the found offline visitor interactive content and the received visitor interactive content.

15. The interactive terminal according to claim 10, wherein
  the at least one application program is further suitable for being loaded by the processor, to perform:
  obtaining an image frame; and generating a visitor tendency movement instruction when performing face detection on the image frame to obtain that the image frame comprises a facial image; and
  moving towards the visitor according to the visitor tendency movement instruction.

16. The interactive terminal according to claim 15, wherein
  the at least one application program is further suitable for being loaded by the processor, to perform:
  inputting the image frame to a convolutional neural network model; obtaining feature maps outputted by a plurality of network layers comprised in the convolutional neural network model; sequentially inputting the feature maps to a memory neural network model; and obtaining a result about whether the image frame outputted by the memory neural network model comprises a facial image.

17. The interactive terminal according to claim 15, wherein
  the at least one application program is further suitable for being loaded by the processor, to perform:
  extracting facial feature data of the facial image; querying, according to the facial feature data, for a preset facial image matching the facial image; obtaining a visitor identity recognition result according to the preset facial image; and obtaining and outputting visitor interactive content that corresponds to the selected feature word and that is associated with the visitor identity recognition result.

18. A non-transitory computer-readable storage medium storing computer program instructions executable by at least one processor to perform:

obtaining visitor voice data of a visitor;

performing word segmentation on a text obtained by recognizing the visitor voice data, to obtain a feature word set;

determining, according to a topic generation model and the feature word set, a determined topic to which the text belongs;

separately obtaining appearing probabilities corresponding to feature words in the feature word set when the feature words belong to the determined topic;

selecting a feature word from the feature words of the feature word set according to the appearing probabilities corresponding to the feature words; and obtaining and outputting visitor interactive content corresponding to the selected feature word.

19. The non-transitory computer-readable storage medium according to claim 18, wherein the determining, according to a topic generation model and the feature word set, a determined topic to which the text belongs comprises:

obtaining, for each feature word in the feature word set according to the topic generation model, a feature word generation probability function corresponding to the current feature word when the current feature word separately belongs to topics in a preset number of topics;

separately determining appearing probabilities corresponding to the feature words in the feature word set when the feature words belong to the topics;

obtaining, for each topic in the preset number of topics, a probability that the text belongs to the current topic, according to an appearing probability that a feature word belongs to the current topic and a feature word generation probability function corresponding to the current topic; and determining a topic corresponding to a maximum probability as the determined topic to which the text belongs.

20. The non-transitory computer-readable storage medium according to claim 19, wherein the obtaining, for each feature word in the feature word set according to the topic generation model, a feature word generation probability function corresponding to the current feature word when the current feature word separately belongs to topics in a preset number of topics comprises:

selecting, for each feature word in the feature word set according to the topic generation model, a topic to which the current feature word belongs, according to a polynomial distribution of the preset number of topics and the feature words, and generating the current feature word in the selected topic condition according to a polynomial distribution of texts and the topics, to construct the feature word generation probability function corresponding to the current feature word when the current feature word separately belongs to the topics in the preset number of topics.

* * * * *